United States Patent [19]

Schmidt

[11] Patent Number: 5,754,536
[45] Date of Patent: May 19, 1998

[54] DIGITAL SPEECH INTERPOLATION METHOD AND APPARATUS

[75] Inventor: William George Schmidt, Sun Lakes, Ariz.

[73] Assignee: Motorola, Inc., Schaumburg, Ill.

[21] Appl. No.: 550,319

[22] Filed: Oct. 30, 1995

[51] Int. Cl.$^6$ .................................. H04J 3/14; H04J 3/16
[52] U.S. Cl. .......................... 370/330; 370/348; 370/436; 370/443; 370/468; 370/478; 370/433; 455/451; 455/452; 455/509; 455/517
[58] Field of Search ........................... 370/95.1, 95.3, 370/80, 81, 79, 13, 17, 61, 310, 321, 328, 329, 330, 431, 433, 436, 438, 464, 465, 468, 478, 477, 522, 528, 282, 277, 278, 294, 348, 347, 349, 459, 443; 455/54.1, 54.2, 79, 447, 450, 451, 452, 509, 510, 511, 517, 68, 69, 70, 71

[56] References Cited

U.S. PATENT DOCUMENTS

| | | | |
|---|---|---|---|
| 4,303,803 | 12/1981 | Yatsuzuka | 177/15.55 R |
| 4,378,603 | 3/1983 | Eastmond | 455/79 |
| 4,426,733 | 1/1984 | Brenig | 455/79 |
| 4,785,450 | 11/1988 | Bolgiano et al. | 370/95.1 |
| 4,949,395 | 8/1990 | Rydbeck | 370/95.3 |
| 5,016,248 | 5/1991 | Cidon et al. | 370/80 |
| 5,134,615 | 7/1992 | Freeburg et al. | 370/95.3 |
| 5,134,710 | 7/1992 | Åkerberg | 370/95.3 |
| 5,329,530 | 7/1994 | Kojima | 370/348 |
| 5,357,513 | 10/1994 | Kay et al. | |
| 5,535,207 | 7/1996 | Dupont | 370/80 |

OTHER PUBLICATIONS

An article by Campanella, "Digital Speech Interpolation" from COMSAT Technical Review, vo. 6, No. 1., Spring 1976.

*Primary Examiner*—Wellington Chin
*Assistant Examiner*—Huy D. Vu
*Attorney, Agent, or Firm*—Sherry Whitney

[57] ABSTRACT

The method and apparatus of the present invention uses DSI with a TDMA/FDMA communication protocol. For each speech frame detected by a speech detector (110), a communication unit (CU) (108) sends (440) a speech detected indicator (SDI) (208) to a switching facility (SF) (138). In response, the SF (138) allocates an uplink reuse unit (260) which identifies a carrier frequency (301-360) and timeslot (190-193) which the CU (108) should use to transmit a traffic burst containing a compressed speech frame. The SF (138) allocates (506) the uplink reuse unit (260) from a pool of available uplink reuse units and, if necessary, allocates a downlink reuse unit (262) from a pool of available downlink reuse units. A message (220) describing the reuse units (260, 262) is transmitted (508) to the CU (108) which then transmits (450) and receives (480) traffic bursts during the allocated reuse units (260, 262).

20 Claims, 13 Drawing Sheets

FIG. 1 —PRIOR ART—

DIGITAL SPEECH INTERPOLATION METHOD AND APPARATUS

FIELD OF THE INVENTION

This invention relates generally to Digital Speech Interpolation and, in particular, to methods of implementing Digital Speech Interpolation in a Frequency Division Multiple Access (FDMA), Time Division Multiple Access (TDMA) communication system.

BACKGROUND OF THE INVENTION

Speech interpolation (SI) is a technique whereby trunk channels are assigned and withdrawn on the basis of active speech existing on an incoming link. SI is typically used on relatively expensive or spectrum-limited paths to increase the effective capacity of a trunk. At the transmitter, a speech detector is used to discriminate between speech portions ("talkspurts") and silent intervals ("pauses"). Because the average percentage of talkspurt to total call duration is about 45%, effective trunk capacity is increased by approximately a factor of two when only the talkspurt is transmitted. Thus, trunk resources are freed up for other transmissions.

"Freeze-out" is a condition where the inputs to the SI system exceed the trunk capacity of the system. Freeze-out occurs where more talkspurts are present than can be transmitted by the trunk. For example, if an SI system is configured to have an effective trunk capacity as if the average talkspurt percentage is 50%, freeze-out will occur when the instantaneous talkspurt percentage exceeds 50%. When freeze-out occurs, the "frozen out" talkspurt sample transmission must either be delayed or not transmitted; if the latter occurs, it results in lower speech quality. The industry objective is typically about 0.2% frozen out talkspurt samples to total talkspurt samples.

As used herein, the terms "uplink" and "transmit link" refer to communications from a communication unit to a system node (e.g., a switching facility) and the terms "downlink" and "receive link" refer to communications from the system node to the communication unit. The term "full-duplex" refers to a communication method where uplink and downlink data are transferred simultaneously.

Application of Digital Speech Interpolation (DSI) to satellite communications has been described in S. Campanella, *Digital Speech Interpolation*, 6 COMSAT TECHNICAL REVIEW 127 (Spring 1976). More recently, DSI has been used in digital speech transmission systems using both optical and satellite intercontinental trunks. Yatsuzuka, U.S. patent application Ser. No. 4,303,803, describes a DSI system employing a speech detector and a predictive coding scheme to reduce bit rates transmitted over a transmission line. The Yatsuzuka system seeks to decrease the occurrence of freeze-out. When freeze-out starts to occur, the system reduces the number of bits produced by a predictive coder having variable-bit quantization. Yatsuzuka is applicable to trunked communication systems, but has not been applied to Frequency Division Multiple Access (FDMA), Time Division Multiple Access (TDMA) communication systems.

Kay et al., U.S. Pat. No. 5,357,513, describes a DSI system for a mobile telephone system. Kay et al. discloses multiplexing plural voice traffic channels on a group of carriers using a TDMA/FDMA protocol. DSI is used to increase the system's traffic carrying capacity.

The system disclosed in Kay et al. supports full-duplex communications. The uplink and downlink carrier frequencies are distinct from each other. The downlink frequency band and the uplink frequency band each have a "pool" of available carrier frequencies and timeslots. When a talkspurt is detected on the uplink, the uplink pool is searched to find an available uplink carrier frequency and timeslot. Similarly, when a talkspurt is to be transmitted on the downlink, the downlink pool is searched.

The implementation of a full-duplex system within the confines of a single, continuous block of spectrum has some disadvantages. Prior-art, full-duplex systems can result in two different types of interference.

A first type of interference may be called "active inter-modulation" interference. After multi-signal radio frequency (RF) amplification in a system having non-linearity, a first RF signal has inter-modulation products which appear outside the intended spectral band of the first RF signal. Where a second RF signal is spectrally-located near the spectral band of the first RF signal, the inter-modulation products from the first RF signal could cause interference with the second RF signal. Similarly, inter-modulation products from the second RF signal could cause interference with the first RF signal. This problem exists in prior-art systems where the uplink carrier frequencies and the downlink carrier frequencies are located near one another along the spectrum. Inter-modulation products from the uplink also can cause interference in the downlink, and vice versa, unless design care is exercised.

A second type of interference that can exist in prior-art, full-duplex systems is called "passive inter-modulation" interference. When an antenna is being used to transmit and receive signals at the same time, nonlinearities in the antenna can passively develop interference between the transmitted and received signals. Typically, two antennas (one for transmission and another for reception) are then required for full-duplex systems. Both types of inter-modulation interference result from the full-duplex nature of prior art systems.

A different type of interference exists in prior-art cellular communication systems. This other type of interference, referred to herein as "inter-cell" interference, results from interfering antenna sidelobe patterns. In many systems, multiple cells are used to provide service to a particular area and each cell typically contains multiple channels. Each channel is defined by a carrier frequency and timeslot. Adjacent cells should not provide channels that use identical carrier frequencies and timeslots because the identical channels will interfere with each other. In order to efficiently provide channels using a limited spectrum, however, identical channels are often used in cells which are separated from each other by one or more other cells. In an ideal world, no interference would exist. However, signals from one cell can scatter to a non-adjacent cell, producing antenna sidelobe interference.

Prior-art systems can allow perceptible inter-cell interference by maintaining an interference-laden traffic channel for too long. As used herein, a "speech frame" is a portion of a speech waveform that is separately processed by a vocoder to produce a set of bits. Common speech frames include from 20–90 msec of speech samples. An average talkspurt, which typically lasts about 1.5 seconds, can contain from 17 to 75 speech frames, depending on the duration of the speech frame. A "traffic burst" is defined herein as a transmission of a set of bits for a single speech channel, where the traffic burst is transmitted intermittently in burst format rather than as a continuous bitstream.

In a TDMA/FDMA system, a timeframe and frequency band are divided into timeslots and carriers, respectively.

which are allocated for traffic bursts. Usually, in a TDMA system, the set of bits for a speech frame is transmitted in one traffic burst. Thus, the information contained within a single talkspurt can take from 17 to 75 traffic bursts to transmit.

Some prior-art systems assign a particular carrier and timeslot for an entire talkspurt or call. This leaves the talkspurt or call subject to possible peak inter-cell interference from another carrier-timeslot assignment for the duration of the call or talkspurt. Since the duration of a talkspurt may last, for example, from 17 to 75 bursts, the impact of the interference on a talkspurt can be perceptible to the called party. The impact is likely to be even greater for a system using the assignments for an entire call.

In a TDMA/FDMA system, some resources must be allocated to communicating control information between communication units and switching facilities. FIG. 1 illustrates a prior-art TDMA/FDMA protocol for either an uplink or a downlink. FIG. 1 will be described in terms of the uplink. A similar protocol is disclosed in Kay et al. Carrier frequencies 10–21 indicate different frequencies at which uplink messages can be communicated. Additional carrier frequencies (not shown) could be used to support the downlink. Twelve carrier frequencies 10–21 are illustrated in FIG. 1. Timeslots 22–27 indicate time segments within a timeframe 28 during which separate groups of information are transmitted. Timeslots 22–27 are identified by the numbers 1–6 within the boxes. As used herein, a "traffic unit" 30 is defined as a combination of a single carrier frequency 10–21 and a single timeslot 22–27 that can be allocated to a particular traffic link. FIG. 1 illustrates sixty traffic units 30. A "control unit" 32 is defined herein as a combination of a single carrier frequency 10–21 and a single timeslot 22–27 that is used to transmit control information. FIG. 1 illustrates six control units 32.

The prior-art methods of allocating control units and traffic units are sufficient for some communication systems. However, other systems might require different methods of communicating control information and speech traffic to achieve efficient use of allocated spectrum.

What is needed is a method and apparatus that increases the effective capacity of a limited-bandwidth system by using TDMA/FDMA more efficiently. A method and apparatus that fully utilizes all available timeslots and which efficiently communicates control information is especially desired. Further needed is a method and apparatus which maximizes trunk capacity while reducing the perceived impact of inter-modulation and inter-cell interference.

DETAILED DESCRIPTION OF THE DRAWINGS

The method and apparatus of the present invention increases the effective capacity of a limited-bandwidth system by using TDMA/FDMA more efficiently. As used herein, a "reuse unit" is a combination of a carrier frequency and timeslot which can be reallocated after transmission of each traffic burst. Unlike the prior art, the a preferred embodiment of the present invention allocates reuse units on a traffic burst basis rather than on a talkspurt basis. This reduces the impact of peak inter-cell interference. If there is interference within an allocated reuse unit, the interference will only affect the information within the frequency and timeslot defined by that reuse unit (i.e., for only the duration of a traffic burst). The next traffic burst will be allocated to a different reuse unit and the inter-cell interference will not last for an entire talkspurt.

Also unlike the prior-art systems, a preferred embodiment of the method and apparatus of the present invention operates in a half-duplex mode rather than a full-duplex mode. "Half-duplex" refers to a communication method where uplink and downlink data are not transferred simultaneously, but are transferred during distinct time periods. In the half-duplex mode, uplink bursts are transmitted at different times from downlink bursts. Thus, the uplink and the downlink transmissions are not simultaneous. Operating in this half-duplex mode minimizes degradation from both types of inter-modulation effects even though the transmitted and received bursts are in a commonly allocated portion of the spectrum.

Another difference between a preferred embodiment of the present invention and the prior art is that in a preferred embodiment, carrier frequencies are not apportioned to either the uplink or the downlink. Thus, an uplink or downlink traffic unit can be allocated within any carrier frequency. An uplink and a downlink burst can be in a common carrier frequency but are separated in time.

Figure 1:
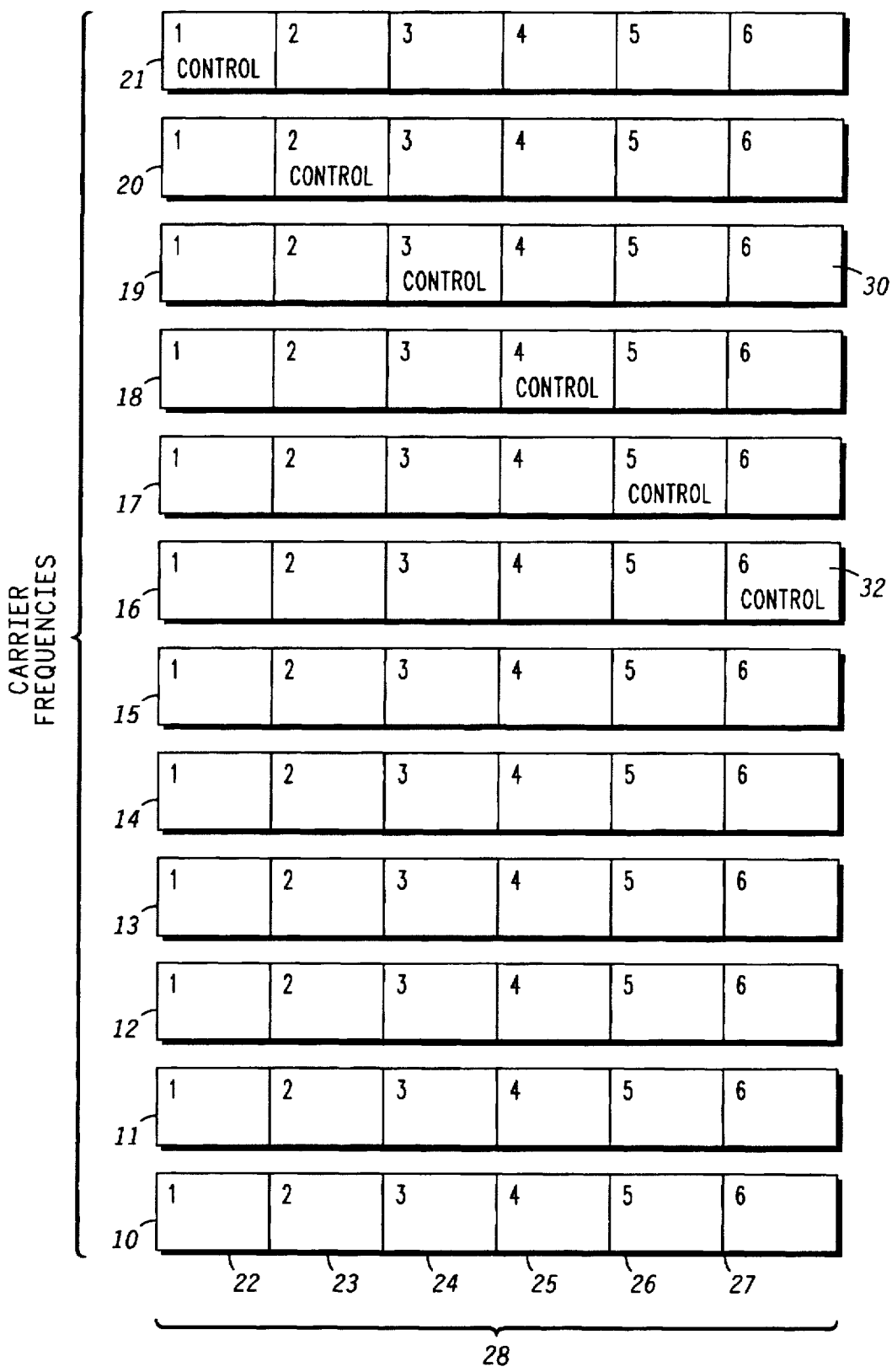
FIG. 1 illustrates a prior-art TDMA/FDMA protocol for either an uplink or a downlink.
Figure 2:
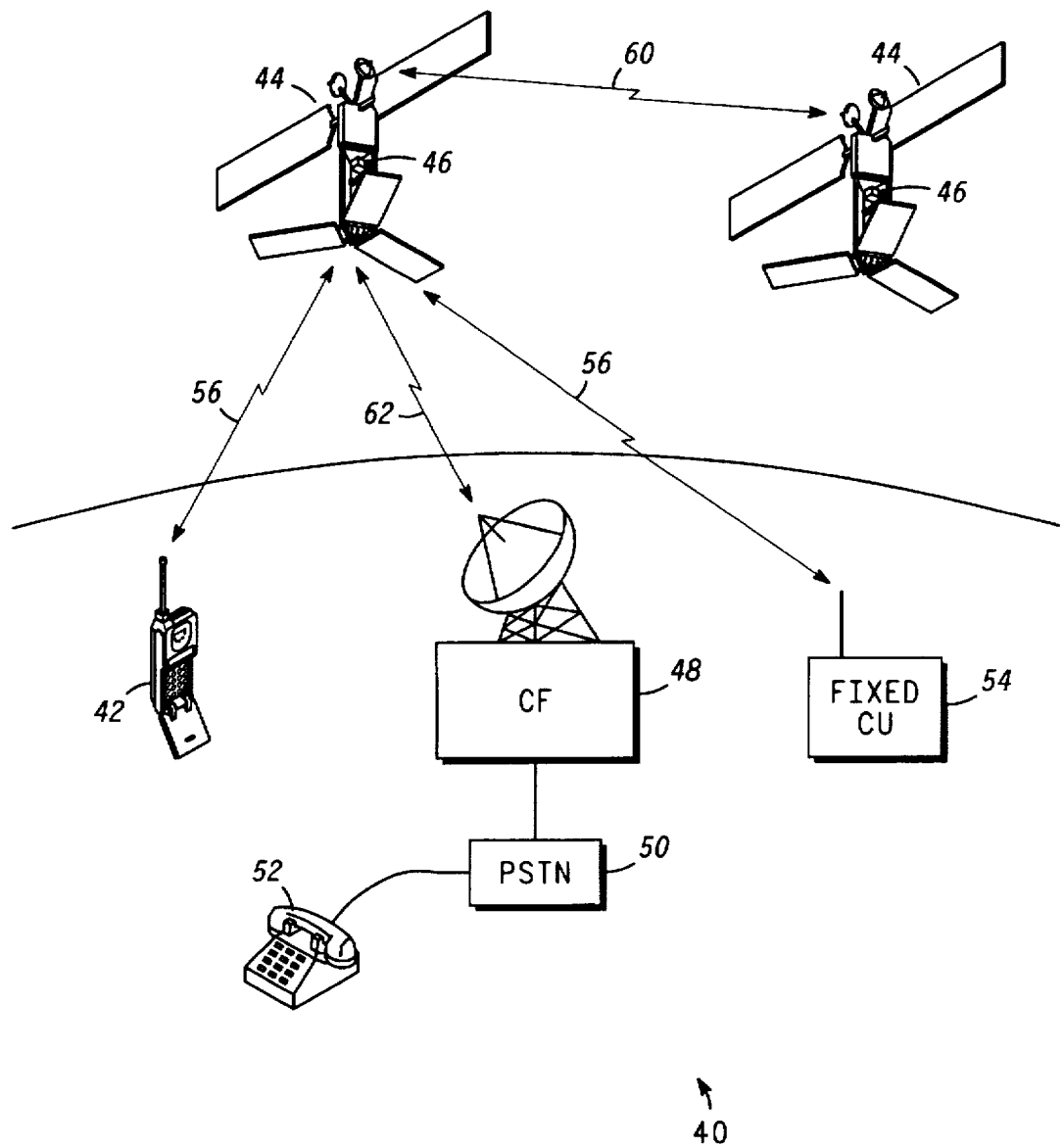
FIG. 2 illustrates an on-board processing/switching, cross-linked satellite communication system in accordance with a preferred embodiment of the present invention.
Figure 3:
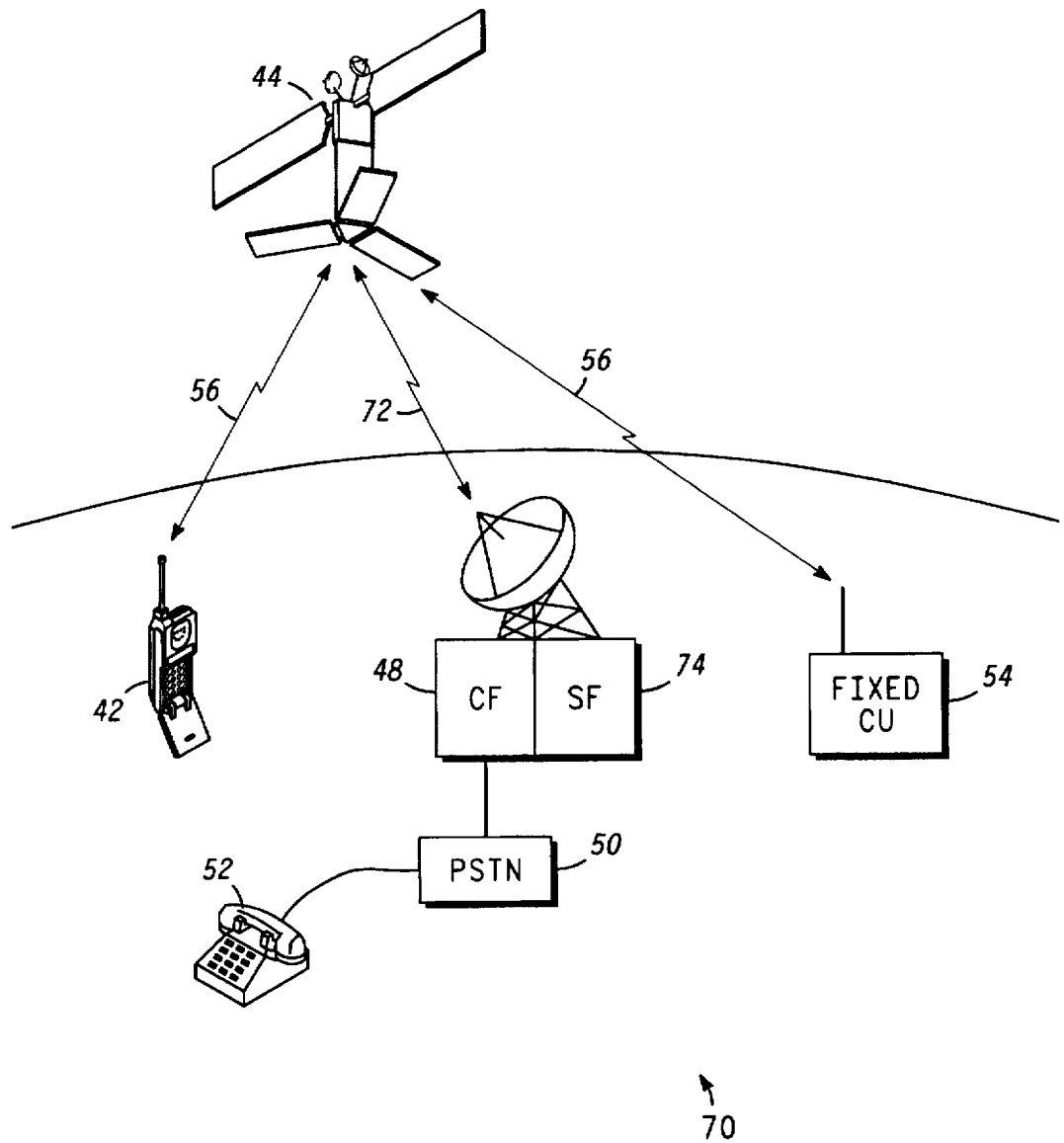
FIG. 3 illustrates a bent-pipe satellite communication system in accordance with an alternate embodiment of the present invention.
Figure 4:
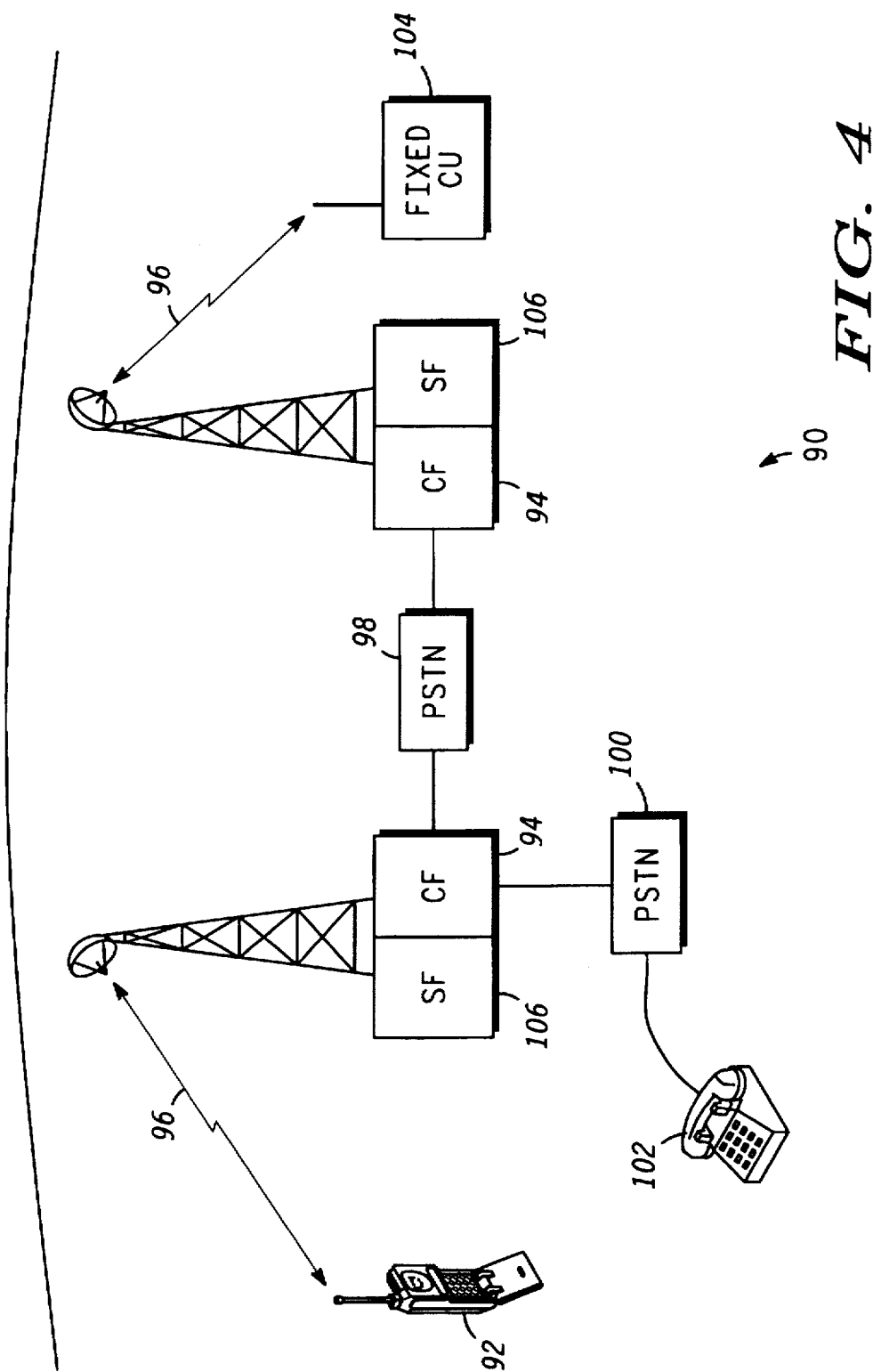
FIG. 4 illustrates a terrestrial RF communication system in accordance with an alternate embodiment of the present invention.

The apparatus of the present invention can be used in a terrestrial or a satellite-based communication system or a combination of terrestrial and satellite-based systems. Additionally, the communication system can use RF and/or hard-wired links which support TDMA/FDMA communications. In FIG. 2, a preferred embodiment of the apparatus of the present invention is described in conjunction with an on-board processing/switching, cross-linked, satellite-based RF communication system. In FIG. 3, an alternate embodiment of the apparatus of the present invention is described in conjunction with a bent-pipe, satellite-based RF communication system. In FIG. 4, an alternate embodiment is described in terms of a terrestrial RF communication system. It should be understood that the embodiments described are for the purposes of description and not of limitation. Any combination of satellite, terrestrial, RF, or hardwired equipment can be used in conjunction with the method and apparatus of the present invention.

FIG. 2 illustrates an on-board processing/switching, cross-linked satellite communication system 40 in accordance with a preferred embodiment of the present invention. Communication system 40 includes Mobile Communication Unit 42 (MCU), satellites 44 having Switching Facilities 46 (SF), Control Facility 48 (CF), Public Switched Telephone Network 50 (PSTN), conventional telephone 52, and Fixed Communication Unit 54 (FCU). Note that, although SF is an abbreviation for "Switching Facility", SF is responsible for both switching and control functions, as will be described below. As used herein, where both MCUs 42 and FCUs 54 perform the same functions, the general term Communication Unit (CU) will be used.

MCU 42 can be, for example, a mobile cellular telephone or radio adapted to communicate with satellites 44 over RF link 56. FCU 54 can be a stationary cellular telephone or radio adapted to communicate with satellites 44 over RF link 56. In a preferred embodiment, links 56 are L-band links which are capable of supporting DSI. Links 60, 62 are not L-band links and do not support DSI.

Unlike conventional telephone 52, CUs 42, 54 desirably include a speech detector and a vocoder device for compressing and decompressing speech data. The speech detector determines whether the user of CU 42, 54 is talking. When speech is detected, CU 42, 54 sends a "Speech Detected Indicator" (SDI) to an SF 46 that is servicing CU 42, 54. SF 46 is desirably co-located with satellite 44. In a preferred embodiment, the SDI is communicated using a single bit within an uplink control burst. When the SDI bit indicates that speech is present, SF 46 allocates a carrier frequency and a timeslot for the CU 42, 54 to transmit a burst of the user's speech. In an alternate embodiment, the SDI can be sent in a separate message to SF 46. As used herein, when a CU "sends an SDI" to an SF, any method of informing the SF that the CU has detected speech is intended to be covered.

An SF is a destination facility for an uplink burst and an origination facility for a downlink burst. As used herein, the term "uplink" refers to any link where a CU is the originator of a message destined for an SF. Similarly, the term "downlink" refers to any link where the SF is the originator of a message destined for a CU. The terms cover both satellite-based and terrestrial communication systems or combinations thereof.

After receiving an SDI from a CU 42, 54, SF 46 allocates an uplink reuse unit for the CU 42, 54 to use to send a traffic burst containing a representation of the speech. SF 46 then sends information describing the allocated reuse unit to the CU 42, 54 in a "reuse unit allocation message" within a downlink control burst. CUs 42, 54 are described in more detail in conjunction with FIG. 5 and the reuse unit allocation process is described in more detail in conjunction with FIGS. 13–16. A preferred embodiment of an SF is described in more detail in conjunction with FIG. 6.

Satellites 44 can be low-earth, medium-earth, or geostationary satellites. In a preferred embodiment, satellites 44 are low-earth orbit satellites which communicate with each other over cross-link 60. Thus, a call from a first CU 42, 54 that is serviced by a first satellite 44 can be routed directly through one or more satellites over cross-links 60 to a second CU 42, 54 serviced by a second satellite 44. Satellites 44 route speech-bearing data packets received from CUs 42, 54, CF 48, and other communication devices (not shown). Satellites 44 communicate with CF 48 over link 62.

CF 48 is a device which provides an interface between satellites 44 and a terrestrial telephony apparatus, such as PSTN 50, which provides telephone service to conventional telephone 52.

In a preferred embodiment, communication system 40 operates in a half-duplex mode. At a particular time, every CU 42, 54, and satellite 44 are either transmitting on the uplink or transmitting on the downlink. The uplink and the downlink portions of links 56 do not intersect in time. The use of TDMA in conjunction with half-duplex operation requires that each CU 42, 54, and satellite 44 have time synchronized links 56. In an alternate embodiment, communication system 40 can operate in a full-duplex mode. However, full-duplex operation might not achieve some of the advantages of the preferred embodiment, as described below.

FIG. 2 illustrates only a few of CUs 42, 54, satellites 44, CF 48, PSTN 50, and telephone 52 for ease of illustration. However, any number of CUs 42, 54, satellites 44, CFs 48, PSTNs 50, and telephones 52 can be used in a communication system.

FIG. 3 illustrates bent-pipe satellite communication system 70 in accordance with an alternate embodiment of the present invention. Communication system 70 differs from communication system 40 (FIG. 2) in that satellite 44 does not communicate with other satellites over cross-links, nor is there any on-board processing or switching. Instead, traffic bursts from CUs 42, 54 are routed through communication system 70 by using "bent-pipe" routes.

In bent-pipe communication system 70, links 56, 72 are L-band links. Thus, all links 56, 72 are capable of supporting DSI. In this bent-pipe configuration, CF 48 utilizes co-located SF 74.

FIG. 4 illustrates terrestrial RF communication system 90 in accordance with an alternate embodiment of the present invention. Communication system 90 includes MCU 92, CFs 94, SFs 106, PSTNs 98, 100, conventional telephone 102, and FCU 104. MCU 92 can be, for example, a mobile cellular telephone or radio adapted to communicate with CFs 94 over RF links 96. FCU 104 can be, for example a stationary telephone or radio adapted to communicate with CFs 94 over RF links 96. CUs 92, 104 are described in more detail in conjunction with FIG. 5.

CF 94 is a device which interfaces CUs 92, 104 with PSTNs 98, 100. In addition, CF 94 can perform other system functions. Multiple CFs 94 can be linked together through PSTN 98. PSTN 98 enables CUs 92, 104 in different areas to communicate with each other.

SF 106 is desirably co-located with CF 94. SF 106 allocates traffic reuse units to a CU 92, 104 after receiving an SDI from a CU 92, 104. The reuse unit allocation process is described in more detail in conjunction with FIGS. 13–16. A preferred embodiment of SF 106 is described in more detail in conjunction with FIG. 6.

FIG. 4 illustrates only a few of CUs 92, 104, CFs 94, SFs 106, PSTN 100, and telephone 102 for ease of illustration. However, any number of CUs 92, 104, CFs 94, SFs 106, PSTNs 100, and telephones 102 may be used in a communication system. In alternate embodiments, the systems of FIG. 2, 3, and 4 can be networked together to allow communication between terrestrial and satellite-based RF communication systems.

Figure 5:
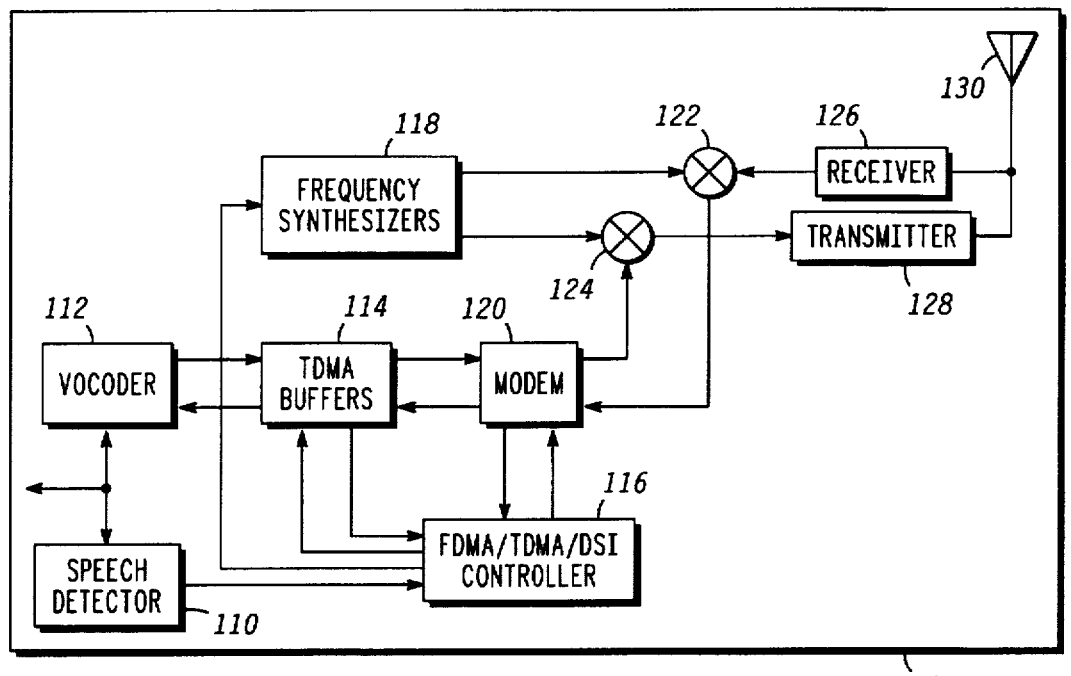
FIG. 5 illustrates a communication unit apparatus in accordance with a preferred embodiment of the present invention.
Figure 6:
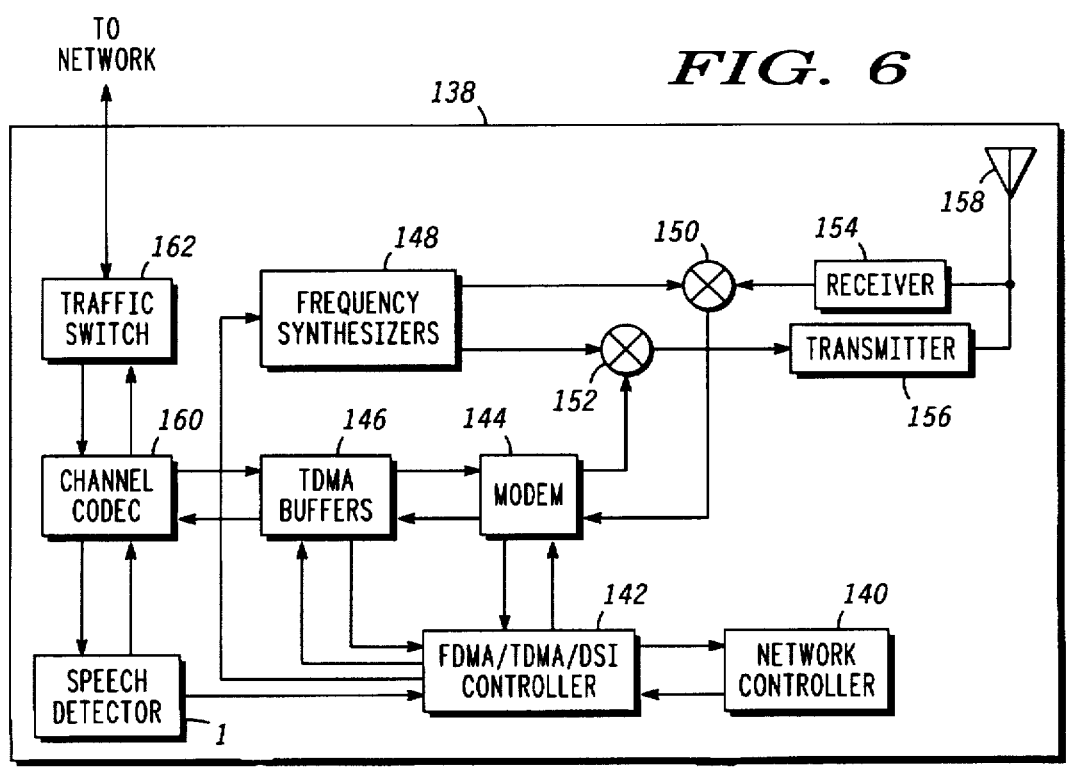
FIG. 6 illustrates a switching facility apparatus in accordance with a preferred embodiment of the present invention.

The apparatus for carrying out the method of the present invention is shown in FIGS. 5 and 6. FIG. 5 illustrates a CU apparatus 108 in accordance with a preferred embodiment of the present invention. CU apparatus 108 can be, for example, any RF communication device designed to process and transmit voice information (e.g., CUs 42, 54, FIGS. 2–3, and CUs 92, 104, FIG. 4). For purposes of description, CU apparatus 108 communicates with a "remote CU" located elsewhere in the communication system.

In a preferred embodiment, CU apparatus 108 includes speech detector 110, vocoder 112, TDMA buffers 114, FDMA/TDMA/DSI controller 116, frequency synthesizers 118, modem 120, mixers 122, 124, receiver 126, transmitter 128, and antenna 130. Each of these components are interconnected as shown in FIG. 5. TDMA buffers 114 include one or more memory storage devices. TDMA buffers 114 include an uplink TDMA buffer and a downlink TDMA buffer. In a preferred embodiment, frequency synthesizers 118 include an uplink frequency synthesizer and a downlink frequency synthesizer. In an alternate embodiment, a single time-shared synthesizer could be used.

The functions performed by CU apparatus 108 will first be described along the transmit path and then along the receive path. At the beginning of the transmit path, speech detector 110 analyses input signals to determine whether the CU user is currently speaking. If so, speech detector 110 sends a signal to FDMA/TDMA/DSI controller 116 indicating that speech is detected. FDMA/TDMA/DSI controller 116 then sends an SDI to the SF (e.g., SF 46, FIG. 2, SF 74, FIG. 3, or SF 106, FIG. 4) which is servicing CU apparatus 108. The SF returns a reuse unit allocation message which contains an uplink reuse unit allocation indicating the carrier frequency and timeslot at which the next uplink traffic burst should be sent. As will be explained later, the reuse unit allocation message can also contain a downlink reuse unit allocation. After the FDMA/TDMA/DSI controller 116 receives the allocated uplink reuse unit from the SF, FDMA/TDMA/DSI controller 116 adjusts uplink frequency synthesizer 118 to the carrier frequency of the allocated uplink reuse unit.

Vocoder 112 continuously processes speech while the other functions performed by CU apparatus 108 are being carried out. While control information is being passed between CU apparatus 108 and the SF, vocoder 112 obtains frames of input speech from the CU user. Each speech frame consists of a number of digital speech samples which have been digitized by an analog to digital converter (not shown). The speech frame samples are compressed by vocoder 112 into a set of bits. These bits are stored in uplink TDMA buffer 114 for later transmission in burst form. The method of transmitting uplink traffic bursts is described in more detail in conjunction with FIG. 13.

At the beginning of the uplink reuse unit timeslot, FDMA/TDMA/DSI controller 116 instructs the uplink TDMA buffer 114 to send the traffic burst through modem 120. Modem 120 modulates the traffic burst and sends it through transmit mixer 124. Transmit mixer 124 combines the modulated signal with the uplink carrier frequency from uplink frequency synthesizer 118. The mixed signal is sent to transmitter 128 which sends the signal over the RF channel via antenna 130.

When receiving RF signals on the downlink, CU apparatus 108 operates as follows. The SF (e.g., SF 46, FIG. 2, SF 74, FIG. 3, or SF 106, FIG. 4) sends CU apparatus 108 a downlink reuse unit allocation before CU apparatus 108 receives each downlink traffic burst. The downlink reuse unit allocation indicates the carrier frequency and timeslot at which CU apparatus 108 will receive the next downlink traffic burst. In a preferred embodiment, the SF sends the downlink reuse unit allocation in the reuse unit allocation message along with the uplink reuse unit allocation. Upon receipt of the downlink reuse unit allocation, FDMA/TDMA/DSI controller 116 adjusts downlink frequency synthesizer 118 to the downlink carrier frequency.

When antenna 130 and receiver 126 receive the next RF traffic burst, the RF signal is sent to receive mixer 122. Receive mixer 122 mixes the RF signal with the downlink carrier frequency from downlink frequency synthesizer 118. The mixed signal is sent through modem 120 where it is demodulated. The demodulated signal is then stored in downlink TDMA buffer 114. Under the control of FDMA/TDMA/DSI controller 116, downlink TDMA buffer 114 enables the traffic bits to be fed to vocoder 112 in a continuous bitstream form. Vocoder 112 then decompresses the bitstream, resulting in a frame of synthesized, digital speech samples. The digital speech samples are sent through a digital to analog converter (not shown) which converts the speech into an analog form for the CU user. The method of receiving downlink traffic bursts is described in more detail in conjunction with FIG. 14.

CU apparatus 108 implements Digital Speech Interpolation (DSI) which increases the effective capacity of an RF trunk by transmitting only frames which contain speech. By using speech detector 110, silent intervals are distinguished from speech frames and the silent intervals generally are not transmitted. Subject to a limited exception for inter-syllabic pauses as described later, when no speech is detected by speech detector 110, no SDI is sent and no uplink traffic burst is transmitted. On the receive side, when CU apparatus 108 does not receive an allocated downlink reuse unit, CU apparatus 108 assumes that the remote CU is experiencing a silent interval.

Because humans are accustomed to some amount of background noise during pauses in a telephone conversation, it is desirable to insert background noise when no speech burst is received from the remote CU. Thus, when no downlink reuse unit allocation is received, CU apparatus 108 inserts "pseudo-noise" into the received speech signal. In a preferred embodiment, pseudo-noise is inserted into the received bitstream by interjecting a "canned" set of bits for a pseudo-noise frame. The canned, pseudo-noise bitstream is processed by vocoder 112, resulting in an audible frame of background noise.

SDIs and reuse unit allocation messages are sent between CU apparatus 108 and an SF over a "control channel". In a preferred embodiment, the control channel frequencies and control channel timeslots are allocated by the SF at the outset of a call. In a preferred embodiment, unlike traffic bursts, the allocation of control channel frequencies and timeslots lasts the duration of the call. Therefore, each time control information is to be transmitted or received, FDMA/ TDMA/DSI controller 116 must adjust frequency synthesizers 118 and control TDMA buffers 114 to transmit and receive the control information.

As explained previously, CU apparatus 108 communicates with an SF (e.g., SF 46, FIG. 2, SF 74, FIG. 3, or SF 106, FIG. 4) to obtain transmit and receive reuse unit allocations. FIG. 6 illustrates SF apparatus 138 in accordance with a preferred embodiment of the present invention. In various embodiments, SF apparatus 138 can be located in a satellite or co-located with a CF. For example, in communication system 40 (FIG. 2), SF 46 is located in satellite 44. In communication system 70 (FIG. 3), SF 74 is co-located with CF 48. Similarly, in communication system 90 (FIG. 4), SF 106 is co-located with CF 94.

SF apparatus 138 includes network controller 140, FDMA/TDMA/DSI controller 142, modem 144, TDMA buffers 146, frequency synthesizers 148, mixers 150, 152, receiver 154, transmitter 156, and antenna 158. When multiple SFs exist within a communication system, SF apparatus 138 also includes channel codec 160 and traffic switch 162 to enable communication with the rest of the network. As explained below, SF apparatus 138 also includes speech detector 163 in a preferred embodiment. TDMA buffers 146 include an uplink TDMA buffer and a downlink TDMA buffer. In a preferred embodiment, frequency synthesizers 148 include an uplink synthesizer and a downlink synthesizer. In an alternate embodiment, a single time-shared synthesizer could be used. Each of these components are interconnected as shown in FIG. 6.

At the outset of a call, SF apparatus 138 receives a message indicating that a CU has gone off hook. After synchronizing with the CU, SF apparatus 138 assigns a control channel uplink and downlink carrier frequency and a control channel uplink timeslot to the CU for the duration of the call. The control carrier frequencies and timeslot will be referred to collectively herein as the "control channel". This information is sent to the CU in a message referred to herein as a "Control Channel Identification message" (CCID).

The functionality of SF apparatus 138 will be described first for when SF apparatus 138 receives a traffic burst from a CU on the uplink, and then for when SF apparatus 138 transmits a traffic burst to a CU on the downlink. On the uplink side, a CU indicates that it needs to transmit a traffic burst on the uplink by sending an SDI to SF apparatus 138 over the control channel. After receiving the SDI, network controller 140 evaluates a "pool" of reuse units which are available to be used for uplink traffic bursts. The pools of reuse units will be described in detail in conjunction with FIG. 11.

Network controller 140 selects an uplink traffic reuse unit from the pool which has not been allocated to another CU. Information describing the selected uplink traffic reuse unit is sent to the CU in a reuse unit allocation message. In a preferred embodiment, network controller 140 also selects an unallocated downlink traffic reuse unit and sends information describing the downlink traffic reuse unit in the reuse unit allocation message along with the uplink traffic reuse unit allocation. Where SF apparatus 138 does not have a downlink traffic burst to send to the CU, network controller 140 will not allocate a downlink traffic reuse unit.

When the SF 74 (FIG. 3) is co-located with the CF 48 (FIG. 3) in the bent-pipe configuration, the network controller is concerned with "inbound" and "outbound" links, rather than uplinks and downlinks, respectively.

Just prior to receiving the uplink traffic burst from the CU, FDMA/TDMA/DSI controller 142 tunes uplink frequency synthesizer 148 to the carrier frequency in the uplink traffic reuse unit allocation. When the uplink traffic burst is received via antenna 158 and receiver 154, the RF signal is sent to receive mixer 150. Receive mixer 150 mixes the RF signal with the uplink carrier frequency from receive frequency synthesizer 148. The mixed signal is sent to modem 144 where it is demodulated. The demodulated signal is then stored in uplink TDMA buffer 146.

Under the control of FDMA/TDMA/DSI controller 142, the data in uplink TDMA buffer 146 is fed out in a continuous fashion to channel codec 160. Traffic switch 162 then determines how to route the traffic burst.

If the destination CU of the traffic burst is serviced by some other SF in the network (e.g., an SF located in another satellite 44, FIG. 2, or co-located with another CF 48, 94, FIGS. 3-4), traffic switch 162 converts the traffic into continuous form and sends the traffic burst through the network. If the destination of the traffic burst is a CF (e.g., CF 48, FIG. 2), the traffic burst is converted into continuous form and transmitted on a link (e.g., link 62, FIG. 2) between SF apparatus 138 and the destination CF.

If the destination CU of the transmit burst is serviced by the same SF (i.e., SF apparatus 138), traffic switch 162 sends the traffic burst through channel codec 160 to the downlink TDMA buffer 146. Data from the rest of the network can also be stored in downlink TDMA buffer. If a burst is received from another SF in the network, traffic switch 162 sends the burst through channel codec 160 to the downlink TDMA buffer 146. The method of handling uplink traffic bursts in accordance with a preferred embodiment is described in more detail in conjunction with FIG. 15.

Regardless of the origin of a burst of data in downlink TDMA buffer 146, SF apparatus 138 must send the burst to its destination CU. FDMA/TDMA/DSI controller 142 adjusts the downlink frequency synthesizer 148 to the carrier frequency of the downlink reuse unit allocation. At the beginning of the downlink reuse unit timeslot, the TDMA/ FDMA/DSI controller 142 instructs the downlink TDMA buffer 146 to send the traffic burst to modem 144. Modem 144 modulates the traffic burst and sends it to transmit mixer 152. Transmit mixer 152 mixes the modulated traffic burst with the downlink carrier frequency from the downlink frequency synthesizer 148. The mixed signal is then sent on the downlink through transmitter 156 and antenna 158 to the destination CU. The method of handling downlink traffic bursts in accordance with a preferred embodiment is described in more detail in conjunction with FIG. 16.

In a preferred embodiment, SF apparatus 138 also includes speech detector 163. Speech detector 163 enables SF apparatus 138 to receive non-interpolated uplink signals (e.g., over link 62, FIG. 2) and to apply DSI to the signal before it is transmitted on a downlink. Such a signal could originate, for example, from a CF (e.g., CF 48, FIG. 2-3 or CF 94, FIG. 4). When speech detector 163 detects a non-interpolated speech (i.e., a talkspurt), speech detector 163 informs FDMA/TDMA/DSI controller 142 and a downlink reuse unit is allocated. The signal is sent through channel codec 160 and stored in downlink TDMA buffer 146. The burst is then sent over the downlink as described previously. If all communication units of the system have the capabilities of CU apparatus 108 (FIG. 5), then speech detector 163 is not necessary.

Control information is intermingled in time and frequency with traffic bursts. Therefore, FDMA/TDMA/DSI controller 142 must also control frequency synthesizers 148 and TDMA buffers 146 to transmit and receive control information.

In a preferred embodiment, communication systems 40 (FIG. 2), 70 (FIG. 3), and 90 (FIG. 4) operate in a half-duplex mode. At a particular time, every CU 108 and SF 138 are either transmitting on the uplink or the downlink. The system is half-duplex because uplink and downlink transmissions do not intersect in time. The use of TDMA and half-duplex operation requires that each CU 108 and SF 138 be time synchronized. Therefore, in a preferred embodiment, each of these communication devices includes an internal timing device that can be synchronized to a system clock.

Figure 7:
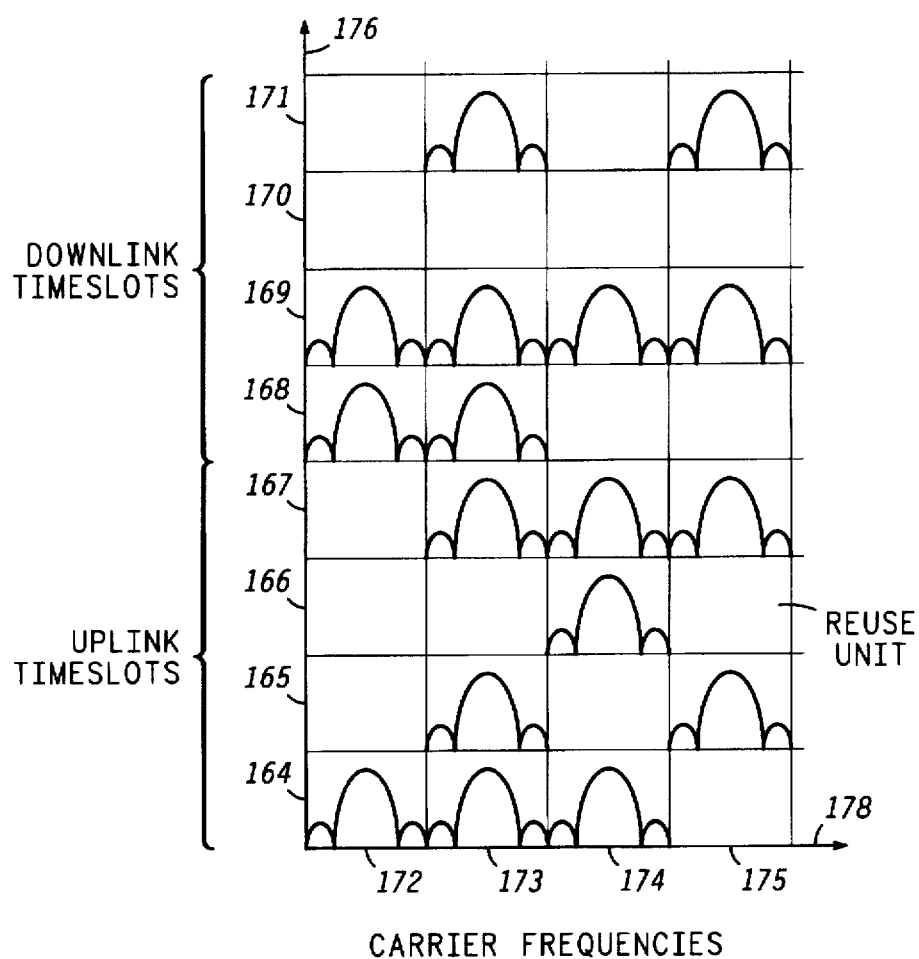
FIG. 7 illustrates a TDMA/FDMA, half-duplex bandwidth allocation in accordance with a preferred embodiment of the present invention.

Half-duplex operation and the TDMA/FDMA spectral division according to a preferred embodiment are described in conjunction with FIGS. 7-11. FIG. 7 illustrates a TDMA/FDMA, half-duplex bandwidth allocation in accordance with a preferred embodiment of the present invention.

Referring to FIG. 7, the spectrum is divided along time axis 176 into timeslots 164-171. The spectrum is also divided along frequency axis 178 into carrier frequencies 172-175. Although eight timeslots 164-171 and four carrier frequencies 172-175 are shown for purposes of illustration, more or fewer timeslots and/or carrier frequencies can be used. In a preferred embodiment, half-duplex mode is used, where timeslots 164-171 for a particular carrier frequency 172-175 are used for either the uplink or the downlink, but not both simultaneously. Thus, for example, carrier frequencies 172-175 for timeslots 164-167 might be used for the uplink. Carrier frequencies 172-175 for timeslots 168-171 might be used for the downlink. Of course, any combination of timeslots 164-171 could be used for either the uplink or the downlink. In other words, the uplink and the downlink are separated in time, but not in frequency.

Operating in the half-duplex mode minimizes degradation from inter-modulation interference even though the uplink and downlink bursts can be in a commonly allocated portion of the spectrum. Whereas the prior art systems transmit uplink and downlink information simultaneously, creating a high likelihood of inter-modulation interference, uplink and downlink transmissions for a preferred embodiment of the present invention are separated in time. By time-separating the uplink and downlink, inter-modulation interference is not as severe.

In a full-duplex system, when an SF transmits and receives signals at the same time, the receive amplifier receives its own transmitted signals as well as the signal it is supposed to be receiving (e.g., signals from a CU). Because of this, the receive amplifier is required to handle a disparity of power levels, or have a more complex design which enables the receive amplifier to discriminate the power levels of received signals.

In the half-duplex system of the preferred embodiment, the receive amplifier of the SF always knows what power levels are expected to be received at a particular time, and the SF does not transmit signals which interfere with the received signals. Knowledge of the expected power levels allows the system to use a lower amplifier operating point. Thus, the system is more linear and less inter-modulation interference occurs.

Figure 8:
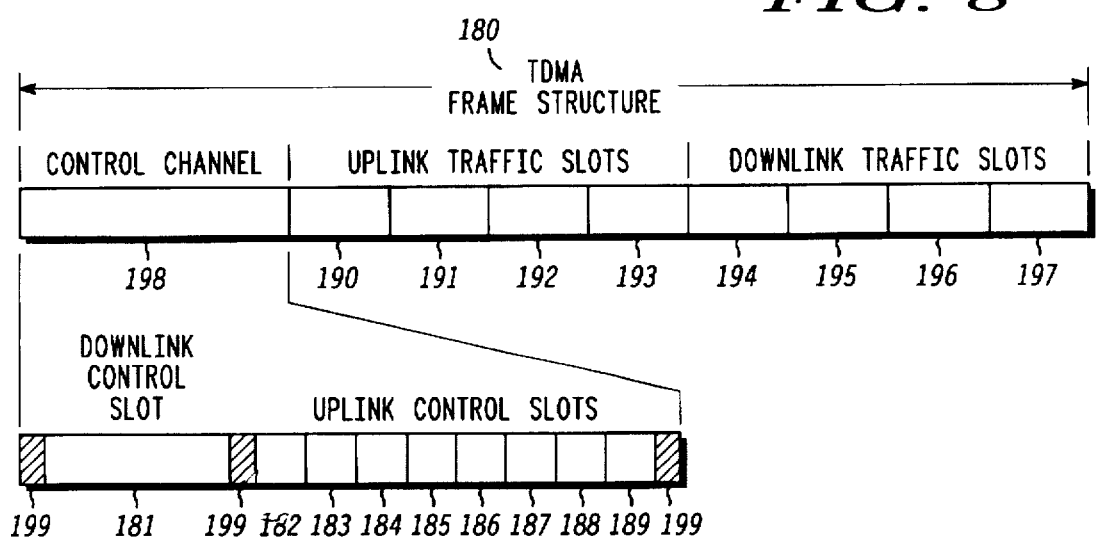
FIG. 8 illustrates a TDMA frame structure in accordance with a preferred embodiment of the present invention.

FIG. 8 illustrates a TDMA timeslot structure 180 in accordance with a preferred embodiment of the present invention. TDMA timeslot structure 180 is broken down into TDMA frame segments 181-197 which include downlink control slot 181, uplink control slots 182-189, uplink traffic slots 190-193, and downlink traffic slots 194-197. The combination of downlink control slot 181 and uplink control slots 182-189 forms control channel 198. Guard times 199 separate downlink control slot 181, uplink control slots 182-189, and traffic slots 190-197.

In a preferred embodiment, when a CU initiates a call, an SF assigns to the CU one carrier frequency on which to receive downlink control bursts, and one carrier on which to send uplink control bursts. The carrier frequencies assigned for the downlink control burst and the uplink control burst can be the same or different. The CU will receive control information from the SF during downlink control slot 181 at the assigned carrier frequency.

Besides assigning the carrier frequency for the uplink control burst, the SF also assigns one of the timeslots 182-189 for the uplink control bursts. The CU will send control information such as SDIs during one of uplink control slots 182-189.

In a preferred embodiment, control information for eight CUs can be transmitted on a particular carrier frequency. Thus, eight uplink control slots 182-189 are shown for exemplary purposes. However, more or fewer uplink control slots can be used. For TDMA frame 180, eight CUs can transmit information to an SF. Each of the eight CU's transmits the control information during its assigned uplink control slot 182-189.

Uplink traffic slots 190-193 contain uplink traffic reuse unit allocations. Downlink traffic slots 194-197 contain downlink traffic reuse unit allocations.

Figure 9:
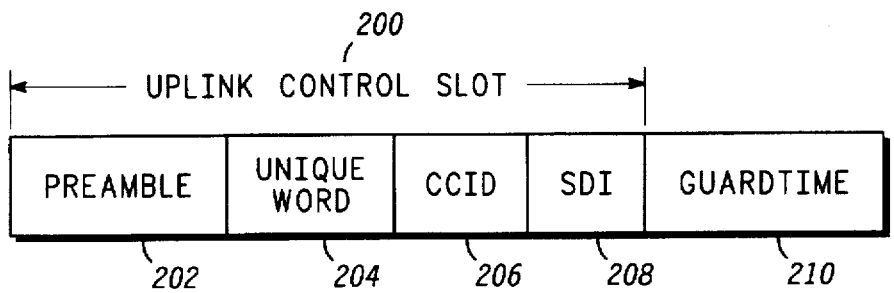
FIG. 9 illustrates an uplink control burst in accordance with a preferred embodiment of the present invention.

FIG. 9 illustrates uplink control slot 200 in accordance with a preferred embodiment of the present invention. Uplink control slot 200 is a more detailed breakdown of a single uplink control slot 182-189 (FIG. 8) which is transmitted from a single CU to the SF that is servicing that CU. Uplink control slot 200 includes preamble 202, unique word 204, CCID 206, and SDI bit 208. Guardtime 210 is appended to uplink control slot 200 to ensure that uplink control slot 200 does not run over into the next burst of information.

Preamble 202 functions to assist rapid acquisition of the carrier and clock signal of the burst by the receiving demodulator. Unique word 204 functions to synchronize the receiver to the actual starting moment of the burst. Upon receipt of a burst during uplink control slot 200, an SF sends unique word 204 through a "unique word detector" which outputs a pulse before the first bit of the burst. Other methods of acquisition and synchronization can be used.

CCID 206 is an optional field which contains a value that uniquely identifies a CU which the SF is servicing. Although the purpose of the CCID is to indicate a CU's control channel frequencies and timeslot, it can also function to identify the CU. As described previously, at the beginning of each connection, a CU is assigned a CCID. Each CU sends its unique CCID to the SF in each uplink control slot 200. A portion of the CCID 206 designates an uplink control slot (e.g., one of uplink control slots 182-189, FIG. 8). Another portion of CCID 206 designates the control channel carrier frequency (e.g., one of carrier frequencies 301-360, FIG. 11). A CU is not required to send CCID 206 in uplink control slot 200 as long as the timing of bursts is accurate and SF has knowledge of which CUs are assigned to which uplink control slot.

SDI bit 208 indicates whether or not the CU has detected speech. For example, SDI bit 208 can contain a binary "one"

when speech is detected, and a binary "zero" when speech is not detected. The SF determines from the state of SDI bit 208 whether or not to allocate an uplink traffic reuse unit for the CU to use for the next uplink traffic burst. When SDI bit 208 indicates that speech is present, the SF will allocate an uplink traffic reuse unit. When SDI bit 208 indicates that no speech is present, the SF will not allocate an uplink traffic reuse unit.

Figure 10:
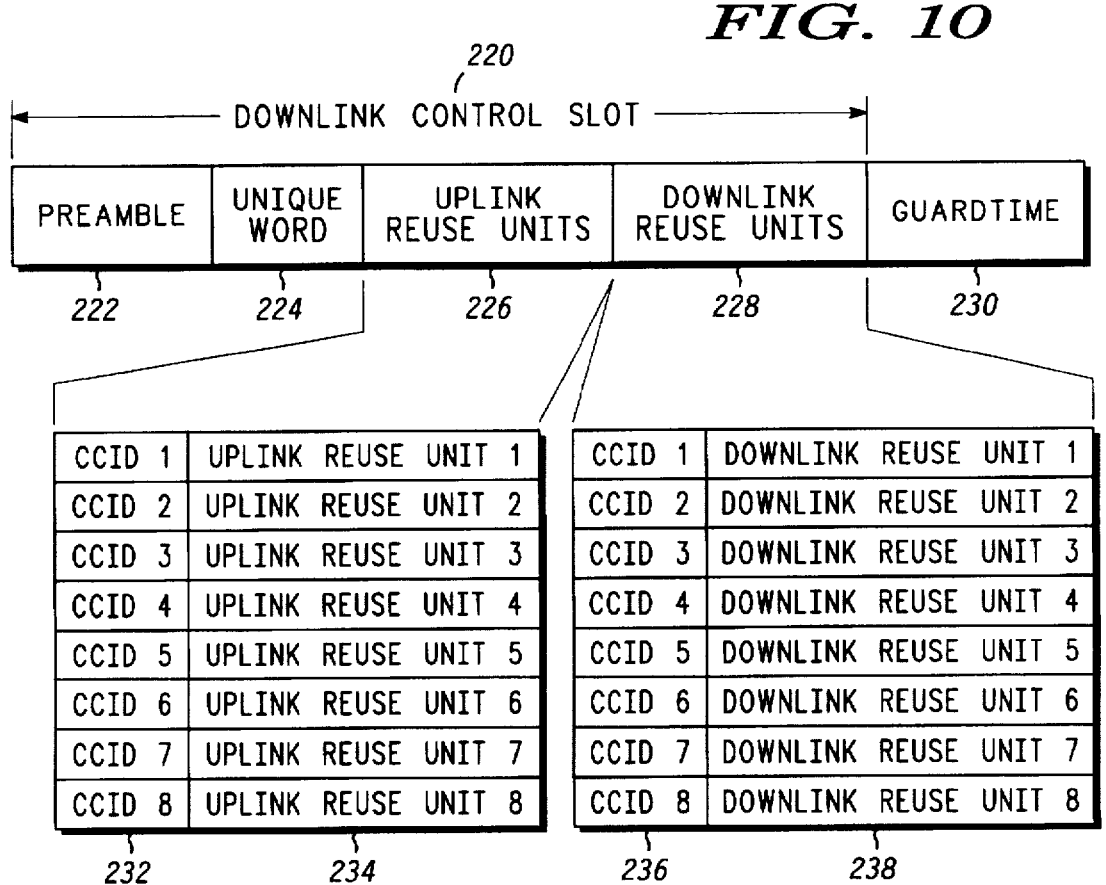
FIG. 10 illustrates a downlink control burst in accordance with a preferred embodiment of the present invention.

FIG. 10 illustrates downlink control slot 220 in accordance with a preferred embodiment of the present invention. Downlink control slot 220 is a more detailed breakdown of downlink control slot 181 (FIG. 8) which is transmitted from an SF to the CUs that the SF is servicing. Downlink control slot 220 includes preamble 222, unique word 224, uplink reuse unit allocations 226, and downlink reuse unit allocations 228. Guardtime 230 is appended to uplink control slot 220 to ensure that uplink control slot 220 does not run over into the next burst of information.

As described previously, preamble 222 functions to assist rapid acquisition of the carrier and clock signal of the burst by the receiving demodulator. Unique word 224 functions to synchronize the receiver to the actual starting moment of the burst.

Uplink reuse unit allocations 226 tell the CUs which uplink reuse unit they are to use for their next uplink traffic burst. In a preferred embodiment, up to eight uplink reuse unit allocations 234 are correlated with CCIDs 232 in the uplink reuse unit allocation field 226.

Similarly, downlink reuse unit allocations 228 tell those same CUs in which downlink reuse unit they will receive the next downlink traffic burst. In a preferred embodiment, up to eight downlink reuse unit allocations 238 are correlated with CCIDs 236 in the downlink reuse unit allocation field 228. In a preferred embodiment, each reuse unit allocation 234, 238 is identified by its carrier frequency and timeslot number. In an alternate embodiment, each reuse unit allocation 234, 238 can be identified by an index which correlates to a particular carrier frequency and timeslot number.

Figure 11:
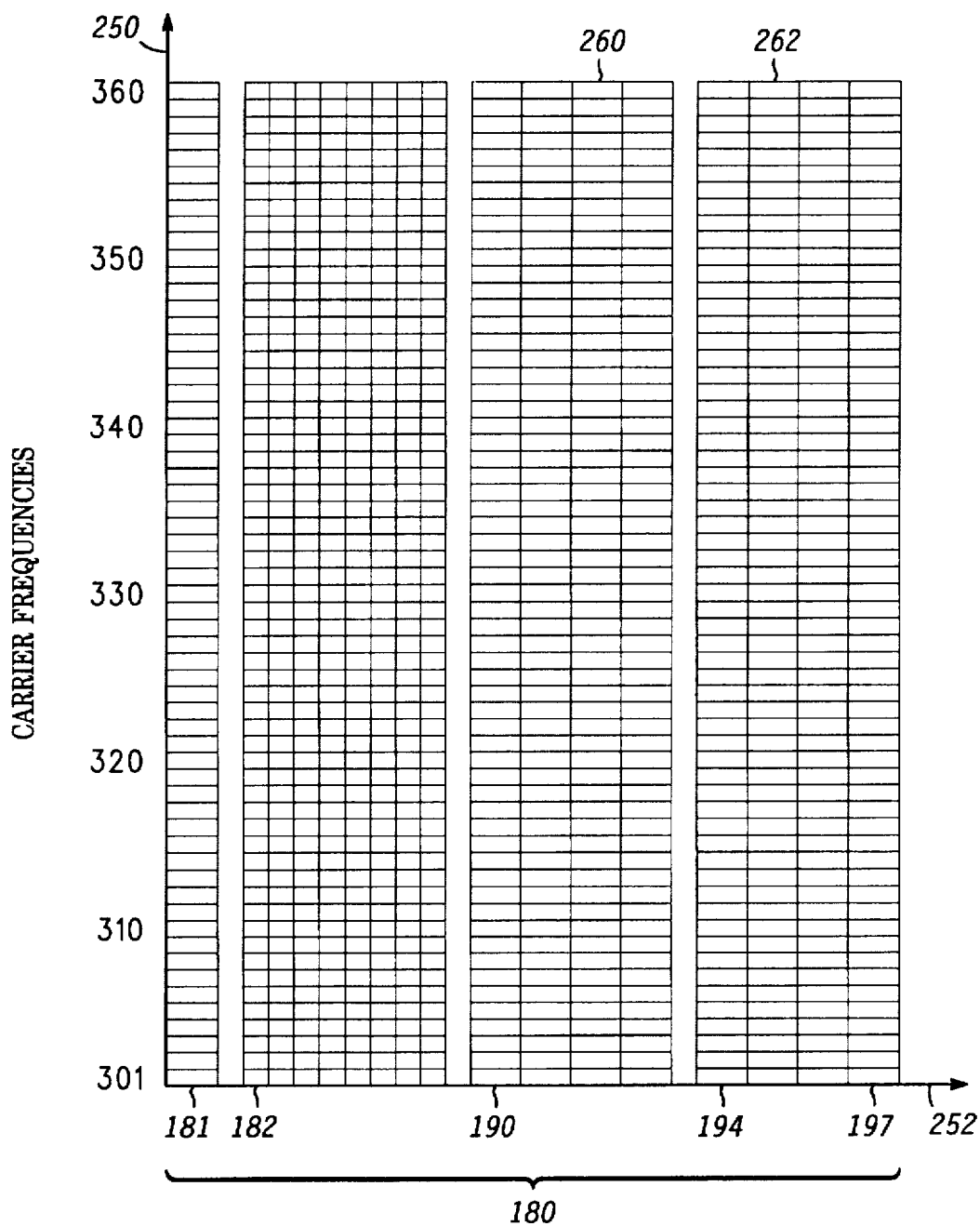
FIG. 11 illustrates a TDMA frame duplicated across multiple FDMA carrier frequencies in accordance with a preferred embodiment of the present invention.

FIG. 11 illustrates TDMA frame structure 180 duplicated across multiple FDMA carrier frequencies 301–360 in accordance with a preferred embodiment of the present invention. Frequency axis 250 is divided into sixty carrier frequencies 301–360. Time axis 252 is divided into the TDMA frame segments 181–197 as described in FIG. 8. Although sixty carrier frequencies 301–360 are shown in FIG. 11, more or fewer carrier frequencies can be used.

FIG. 11 illustrates two hundred and forty uplink traffic reuse units 260 and downlink traffic reuse units 262. In response to an SDI sent from a CU within an uplink control slot 182–189, the SF selects one unallocated reuse unit from the pool of uplink traffic reuse units 260. When there is a traffic burst to be sent over the downlink, the SF also selects one unallocated reuse unit from the pool of downlink traffic reuse units 262. The SF then sends information identifying the allocated uplink traffic reuse unit 260 and the allocated downlink traffic reuse unit 262 to the CU in the downlink control slot 181.

Unlike the prior art, a different traffic reuse unit is allocated for each traffic burst. The frequent reallocation of traffic reuse units in accordance with the present invention minimizes perceived interference which can exist when a particular reuse unit is allocated to a CU for a whole talkspurt or call. Interference might be perceived throughout an entire talkspurt in the prior art because the prior art reallocates on a talkspurt basis. Interference is likely only to exist for a single burst using the method and apparatus of the present invention because the next burst will be allocated to a different traffic reuse unit. Interference in a single burst might not even be perceptible in many cases.

Figure 12:
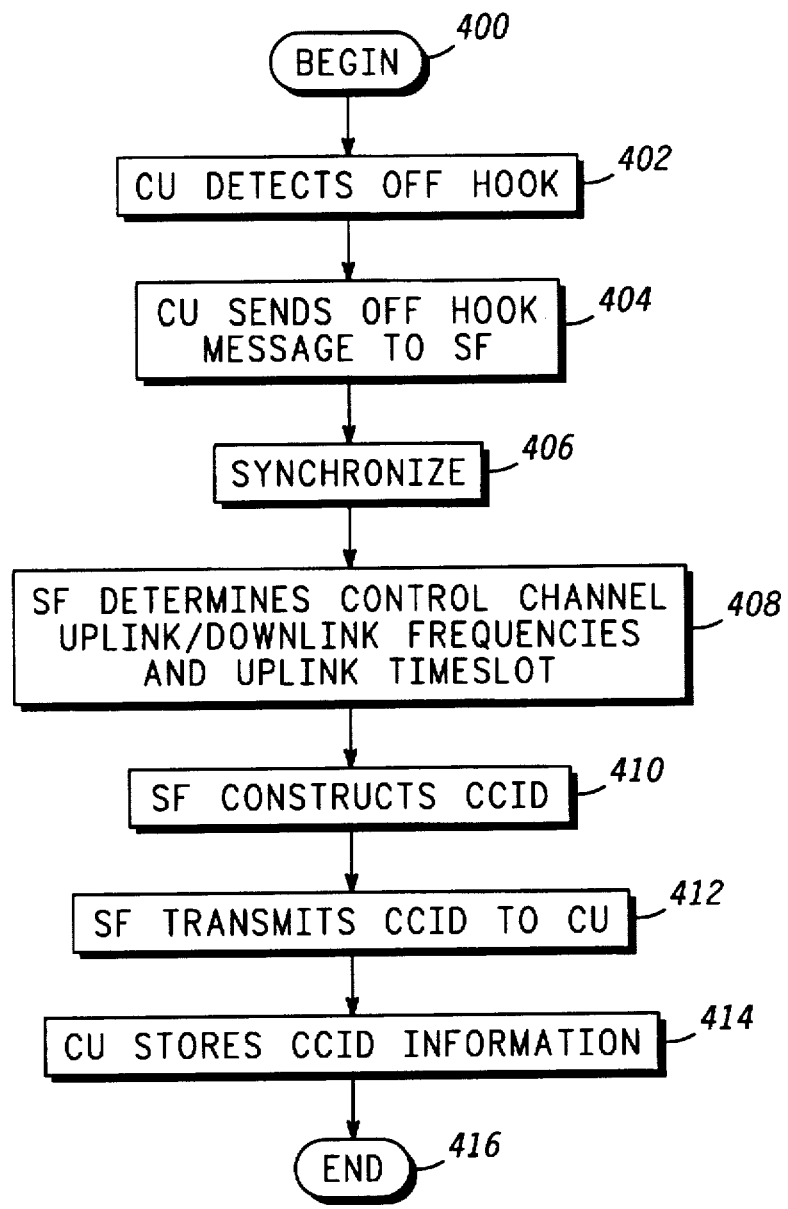
FIG. 12 illustrates a flowchart of a method for setting up the control channel between a switching facility and a communication unit in accordance with a preferred embodiment of the present invention.

The method of allocating reuse units to CUs in accordance with the present invention is described in detail in conjunction with FIGS. 12–16. FIG. 12 illustrates a flowchart of a method for setting up the control channel between an SF and a CU in accordance with a preferred embodiment of the present invention.

The method begins 400 when the CU detects an off hook condition in step 402. The CU then sends an off hook message to the SF in step 404. The CU and the SF then synchronize in step 406.

The SF determines, in step 408, the control channel uplink and downlink frequencies and the uplink control timeslot. As explained previously the control channel frequencies and timeslot are allocated for the duration of the call, unlike the traffic reuse units. In step 410, the SF constructs the CCID with information describing the control channel frequencies and timeslot. The SF transmits the CCID to the CU in step 412.

After the CU receives the CCID, the CU stores the uplink control and downlink frequencies and the uplink timeslot in step 414 for later use. The procedure ends 416.

Figure 13:
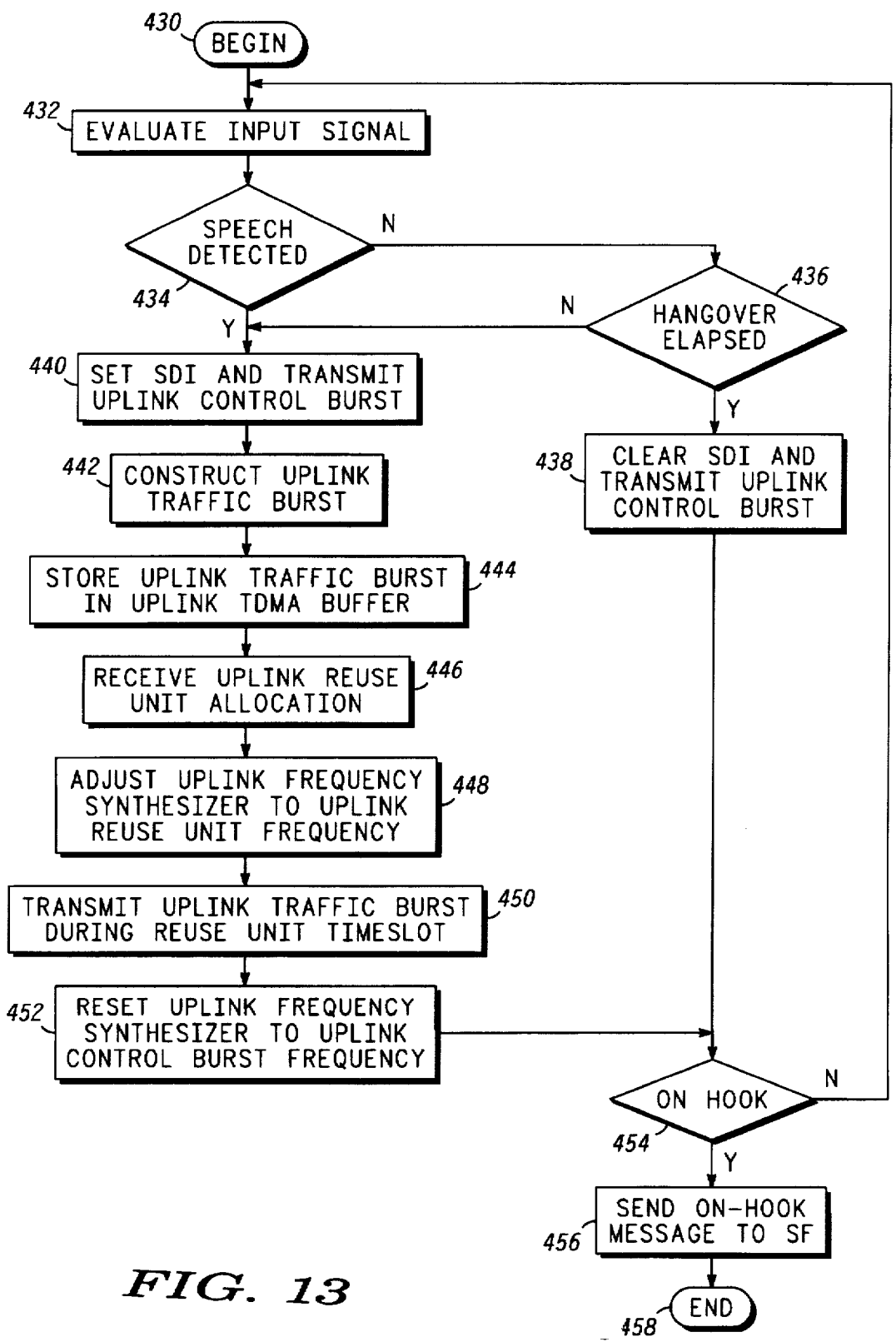
FIG. 13 illustrates a flowchart of a method for a communication unit to transmit traffic bursts over allocated reuse units in accordance with a preferred embodiment of the present invention.

FIG. 13 illustrates a flowchart of a method for a CU to transmit traffic bursts over allocated reuse units in accordance with a preferred embodiment of the present invention. The method begins 430 when the CU evaluates an input signal received from the CU user in step 432. The CU determines whether speech is detected in step 434. If not, the CU determines whether the "hangover time" has elapsed in step 436. The hangover time enables the CU to continue to send speech frames during short, inter-syllabic pauses.

Pauses can have long or very short durations. For example, an inter-syllabic pause can last only a single speech frame length. In a preferred embodiment, the method of the present invention continues to request allocation of transmit reuse units for a short time into a pause so that the connection will not be relinquished for very short pauses. The length of time into a silent interval during which the method of the present invention continues to request allocation of transmit reuse units is referred to herein as the "hangover time". The hangover time should be relatively short. In a preferred embodiment, the hangover time is one speech frame. In alternate embodiments, the hangover time could be two or more frames.

The concept of allowing a hangover time is carried out as follows. Assume that several frames of speech have been transmitted, and then the speech detector detects a frame of no speech. Even though no speech is detected in the frame, the CU will still request allocation of a transmit reuse unit and will transmit the silent speech frame. If the speech detector detects speech within the next frame, requesting and allocating reuse units will continue. If the speech detector does not detect speech within the next frame and the system's hangover time is a single frame, the CU will stop requesting allocations of reuse units.

In a preferred embodiment, "old" talkspurts (i.e., talkspurts that are continuing) are given priority over "new" talkspurts (i.e., talkspurts that are just beginning) in the process of allocating reuse units. Therefore, freeze out will impact only the front edge of a new talkspurt, rather than the middle of an old talkspurt. Impacting only the front edge of a new talkspurt has less of a negative effect on speech quality than impacting the middle of an old talkspurt. Therefore, hangover time ensures that an old talkspurt will maintain priority over a new talkspurt during intersyllabic pauses.

Referring back to FIG. 13, if the hangover time has elapsed in step 436, the SDI bit is cleared in step 438 and the cleared SDI bit is transmitted to the SF in the next uplink control burst. When a speech frame is detected in step 434, or when the hangover time has not elapsed in step 436, the SDI bit is set in step 440 and the set SDI bit is transmitted to the SF in the next uplink control burst.

While the CU is waiting to receive the reuse unit allocation message, the vocoder 112 (FIG. 4) constructs the uplink traffic burst in step 442 and stores the uplink traffic in the uplink TDMA buffer 116 (FIG. 4) in step 444.

In step 446, the CU examines the uplink reuse unit allocation slot 226 (FIG. 10) to extract the uplink reuse unit allocation 234 corresponding to the CCID 232 for the CU. After the uplink reuse unit allocation is received in step 446, the FDMA/TDMA/DSI controller 116 (FIG. 5) adjusts the uplink frequency synthesizer 118 (FIG. 5) for the uplink reuse unit frequency in step 448. The FDMA/TDMA/DSI controller 116 (FIG. 5) then controls transmission of the uplink traffic burst during the uplink reuse unit timeslot in step 450.

Once the uplink traffic burst has been transmitted, the FDMA/TDMA/DSI controller 116 (FIG. 5) resets the uplink frequency synthesizer 118 (FIG. 5) to the uplink control burst frequency in step 452.

After the uplink frequency synthesizer 118 (FIG. 5) has been reset in step 452, or the clear SDI bit has been transmitted in step 438, the CU determines in step 454 whether the CU has gone on hook. If not, the procedure iterates as shown in FIG. 13. If so, the CU sends an on hook message to the SF in step 456 and the procedure ends 458.

Figure 14:
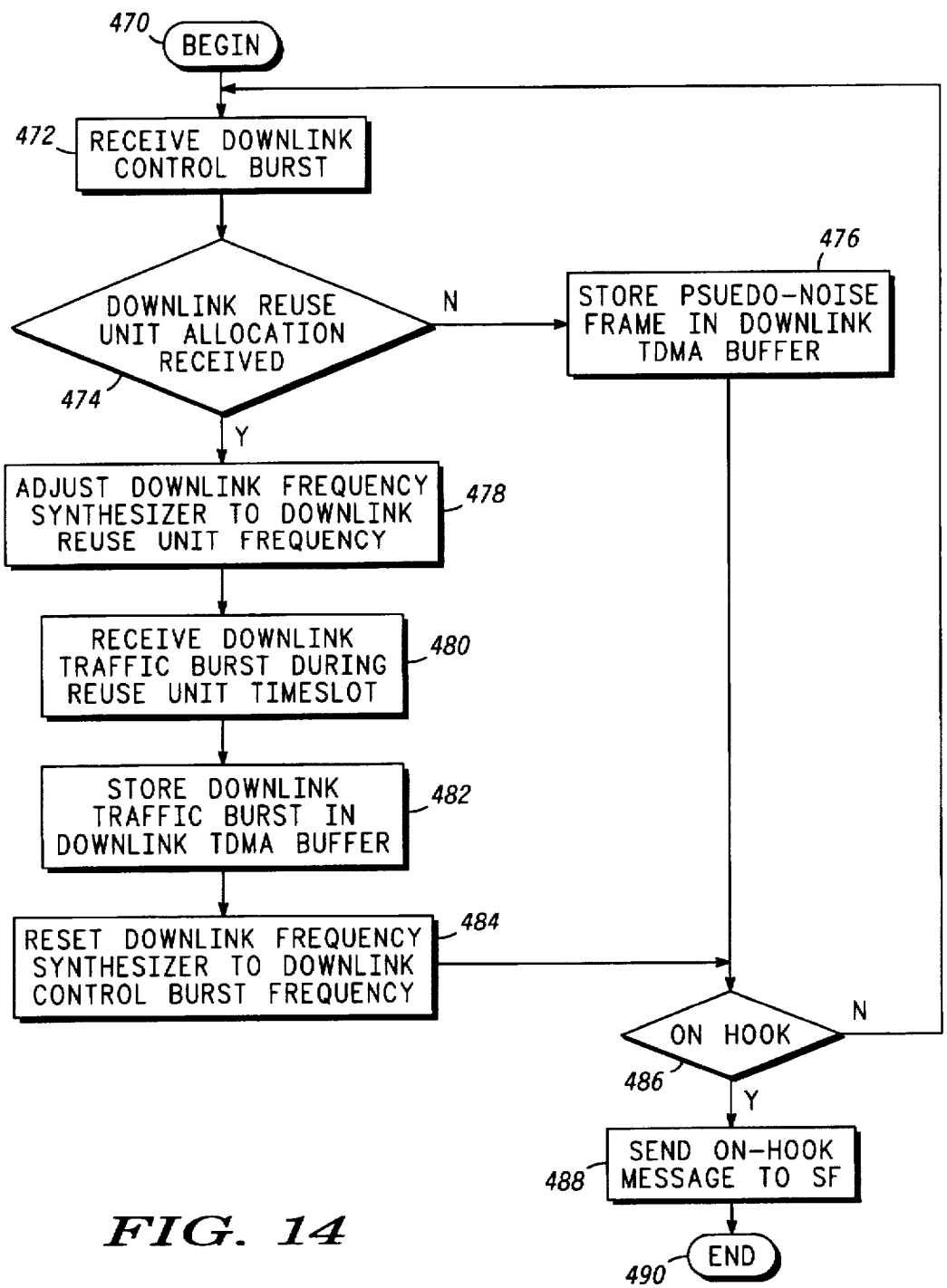
FIG. 14 illustrates a flowchart of a method for a communication unit to receive traffic bursts over allocated reuse units in accordance with a preferred embodiment of the present invention.

FIG. 14 illustrates a flowchart of a method for a CU to receive traffic bursts over allocated reuse units in accordance with a preferred embodiment of the present invention. The method begins 470 when a CU receives a downlink control burst in step 472.

In step 474, the CU examines the downlink reuse unit allocation slot 228 (FIG. 10) of the downlink control burst to determine whether a downlink reuse unit allocation 238 (FIG. 10) has been received for the CCID 236 (FIG. 10) corresponding to the CU. When no downlink reuse unit allocation has been received, the CU stores a pseudo-noise frame in the downlink TDMA buffer 114 (FIG. 5) in step 476. The pseudo-noise frame will ensure that the CU user experiences comfortable background noise when the remote CU user has paused from speaking.

When step 474 indicates that a downlink reuse unit allocation has been received, the CU adjusts the downlink frequency synthesizer 118 (FIG. 5) to the downlink reuse unit frequency in step 478. The downlink traffic burst is then received in step 480 during the downlink reuse unit timeslot. The received downlink traffic burst is stored in the downlink TDMA buffer 114 (FIG. 5) in step 482.

Then, the downlink frequency synthesizer 118 (FIG. 5) is reset to the downlink control burst frequency in step 484. After steps 484 or 476, a determination is made in step 486 whether the CU has gone on hook. If not, the procedure iterates as shown in FIG. 14. If so, the CU sends an on hook message to the SF in step 488 and the procedure ends 490.

Figure 15:
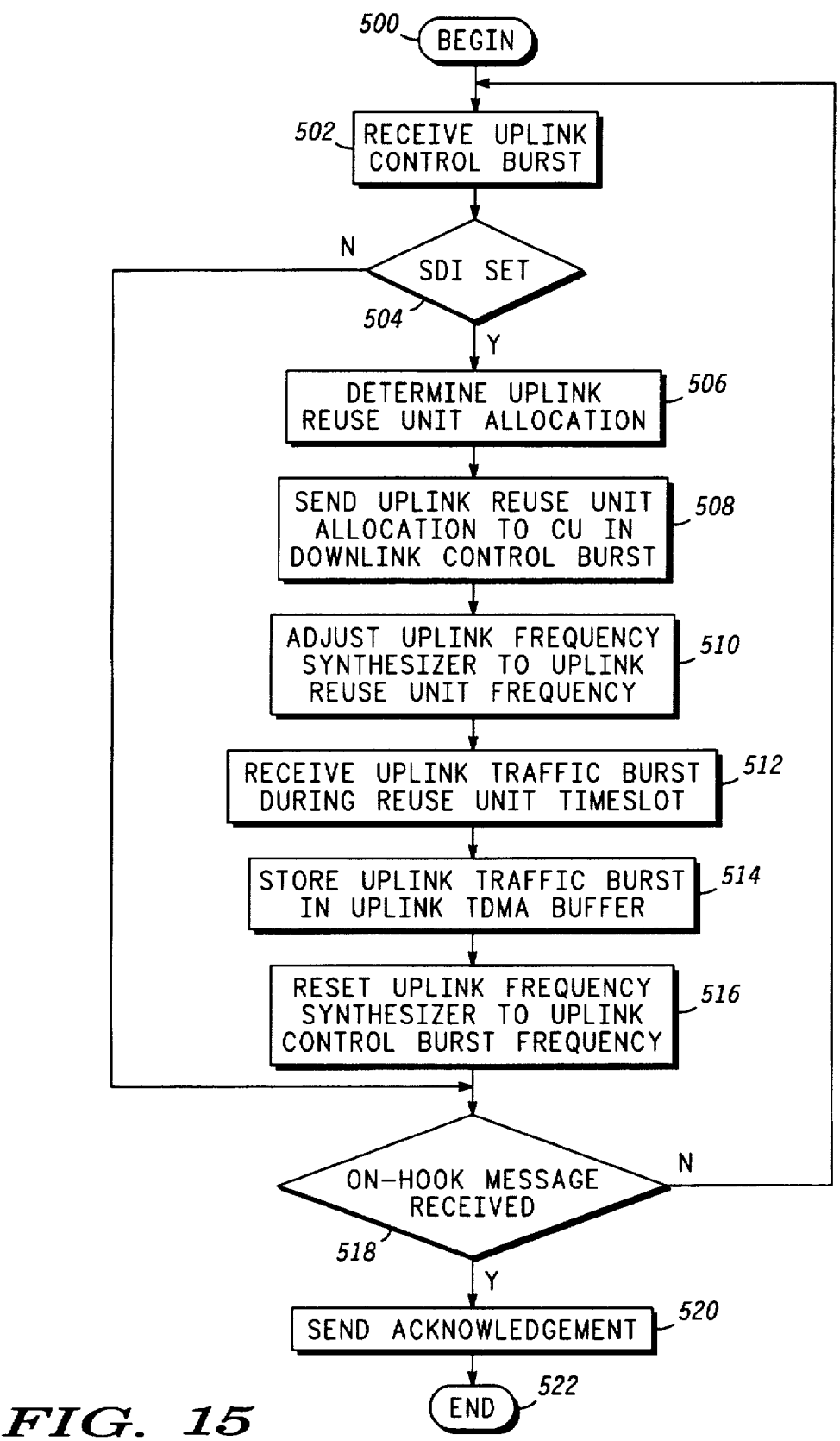
FIG. 15 illustrates a flowchart of a method for a switching facility to allocate uplink reuse units and to receive uplink traffic bursts in accordance with a preferred embodiment of the present invention.

FIG. 15 illustrates a flowchart of a method for an SF to allocate uplink reuse units and to receive uplink traffic bursts in accordance with a preferred embodiment of the present invention. The method begins 500 when the SF receives an uplink control burst from a CU in step 502.

The SF then determines in step 504 whether the SDI bit is set, indicating that the CU has detected speech. If so, the SF determines in step 506 an uplink reuse unit to be used for the next uplink traffic burst. In step 508, information describing the uplink reuse unit is sent to the CU in the uplink reuse unit allocation slot 226 (FIG. 10) of the downlink control burst. The uplink reuse unit allocation 234 (FIG. 10) is correlated with the CCID 232 for that particular CU.

The SF then adjusts the uplink frequency synthesizer 148 (FIG. 6) to the uplink reuse unit frequency in step 510. The uplink traffic burst is received in step 512 during the uplink reuse unit timeslot. The SF stores the uplink traffic burst in the uplink TDMA buffer 146 (FIG. 6) in step 514. The SF then resets the uplink frequency synthesizer 148 (FIG. 6) to the uplink control burst frequency in step 516.

After the uplink frequency synthesizer is reset, or when the SDI was not found to be set in step 504, the SF determines in step 518 whether an on hook message has been received from the CU. If not, the procedure iterates as shown in FIG. 15. If so, the SF sends an acknowledgment message to the CU in step 520 and the procedure ends 522.

Figure 16:
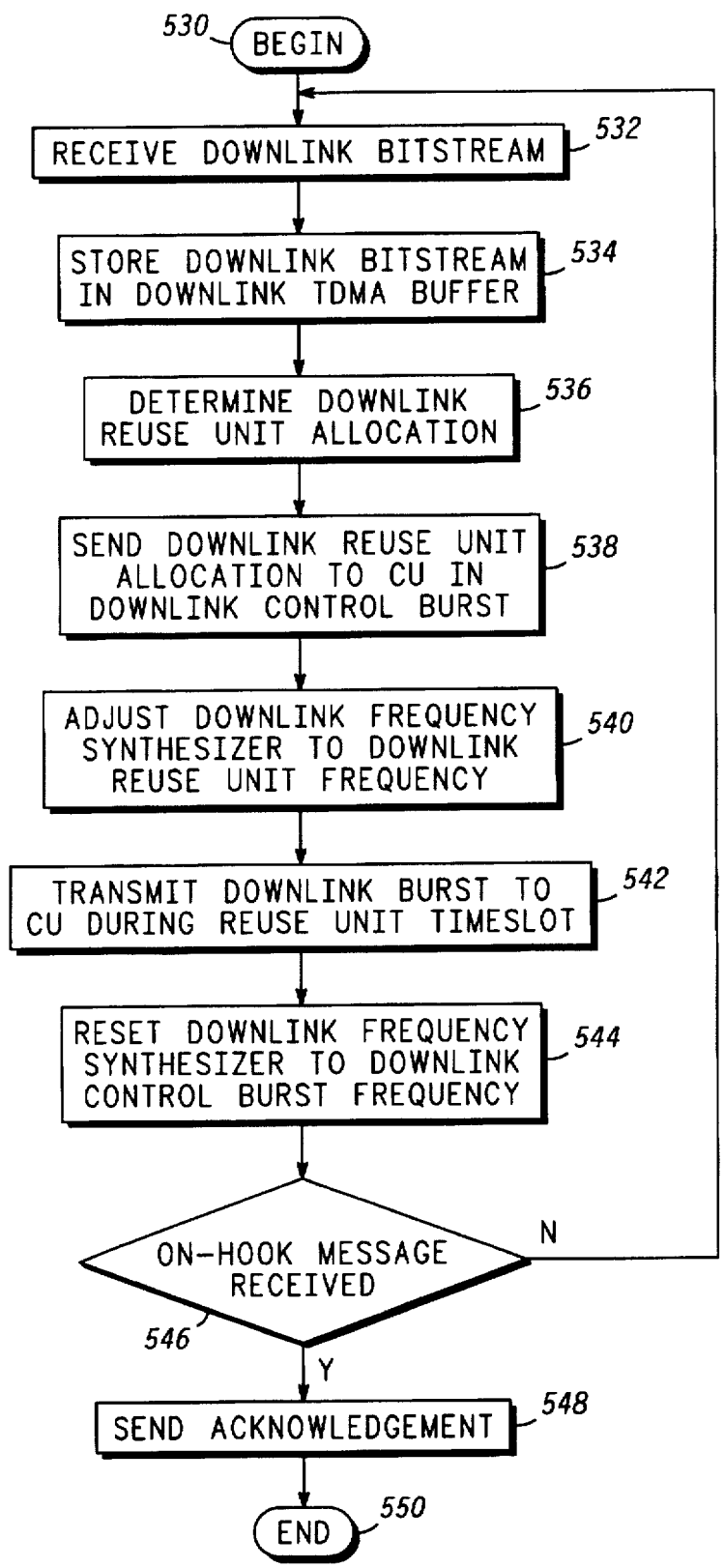
FIG. 16 illustrates a flowchart of a method for a switching facility to allocate downlink reuse units and to transmit downlink traffic bursts in accordance with a preferred embodiment of the present invention.

FIG. 16 illustrates a flowchart of a method for an SF to allocate downlink reuse units and to transmit downlink traffic bursts in accordance with a preferred embodiment of the present invention. The method begins 530 when the SF receives a downlink bitstream in step 532. As explained previously, the downlink bitstream can originate from a CU (e.g., CU apparatus 108, FIG. 5) or from a CF (e.g., CF 48, FIGS. 2-3 or CF 94, FIG. 4). When the downlink bitstream originates from a CU, it is received through a codec (e.g., channel codec 160, FIG. 6). When the downlink bitstream originates from a CF and the bitstream is non-interpolated, a speech detector (e.g., speech detector 163, FIG. 6) determines whether active speech is present in the bitstream and DSI is applied. The downlink bitstream is stored in downlink TDMA buffer 146 (FIG. 6) in step 534.

The SF, in step 536, then determines a downlink reuse unit to use to send a burst of the downlink bitstream to the destination CU. The downlink reuse unit allocation is sent in step 538 to the destination CU in the downlink reuse unit allocation slot 228 (FIG. 10) of the downlink control burst.

The SF adjusts the downlink frequency synthesizer 148 (FIG. 10) to the downlink reuse unit frequency in step 540. Then, the downlink burst is transmitted in step 542 to the CU during the downlink reuse unit timeslot. The SF then resets the downlink frequency synthesizer 148 (FIG. 10) to the downlink control burst frequency in step 544.

A determination is made in step 546 whether an on hook message has been received from the CU. If not, the procedure iterates as shown in FIG. 16. If so, the SF sends an acknowledgment message to the CU in step 548 and the procedure ends 550.

In summary, the method and apparatus of the present invention increase the effective capacity of a limited-bandwidth system by efficiently using TDMA/FDMA in conjunction with DSI. DSI can enable a communication system to more than double its capacity, and the method and apparatus of the present invention allows the communication system to maximize the potential benefits of DSI. The method and apparatus of the present invention operates in a half-duplex mode which minimizes degradation from inter-modulation effects even though the transmitted and received bursts can be in a commonly allocated portion of the spectrum. The method and apparatus of the present invention also reduces perceived inter-cell interference by allocating traffic units on a traffic burst basis rather than on a talkspurt basis. Thus, if there is interference within an assigned traffic unit, the interference will only affect the information within that traffic unit.

What is claimed is:

1. A method for communicating digital speech on a transmit link between a communication unit and a switching facility and on a receive link between the switching facility and the communication unit, wherein the digital speech is communicated during multiple timeslots and at multiple carrier frequencies, and a combination of a carrier frequency of the multiple carrier frequencies and a timeslot of the multiple timeslots can be allocated for a burst of the digital speech when the combination has not been allocated for a different burst, the method comprising the steps of:

a) determining, by the communication unit, whether a speech frame is detected;

b) when the speech frame is detected, sending a speech detected indicator (SDI) to the switching facility;

c) allocating, by the switching facility, a transmit link traffic timeslot of the multiple timeslots and a transmit link traffic frequency of the multiple carrier frequencies in response to the SDI, wherein the transmit link traffic timeslot and the transmit link traffic frequency describe the transmit link traffic timeslot and the transmit link traffic frequency which the communication unit will use only for a duration of the speech frame;

d) sending first parameters defining the transmit link traffic frequency and the transmit link traffic timeslot to the communication unit;

e) adjusting a communication unit transmission frequency to the transmit link traffic frequency;

f) constructing a traffic burst by the communication unit which contains information describing the speech frame; and g) transmitting the traffic burst at the transmit link traffic frequency during the transmit link traffic timeslot.

2. A method for communicating digital speech on a transmit link between a communication unit and a switching facility and on a receive link between the switching facility and the communication unit, wherein the digital speech is communicated during multiple timeslots and at multiple carrier frequencies, and a combination of a carrier frequency of the multiple carrier frequencies and a timeslot of the multiple timeslots can be allocated for a burst of the digital speech when the combination has not been allocated for a different burst, the method comprising the steps of:

a) determining, by the switching facility, the control channel frequency from the multiple carrier frequencies and the control channel timeslot from the multiple timeslots;

b) sending second parameters defining the control channel frequency and the control channel timeslot to the communication unit;

c) determining, by the communication unit, whether a speech frame is detected;

d) when the speech frame is detected, sending a speech detected indicator (SDI) to the switching facility at the control channel frequency and the control channel timeslot;

e) allocating, by the switching facility, a transmit link traffic timeslot of the multiple timeslots and a transmit link traffic frequency of the multiple carrier frequencies in response to the SDI, wherein the transmit link traffic timeslot and the transmit link traffic frequency are allocated only for a duration of the speech frame;

f) sending first parameters defining the transmit link traffic frequency and the transmit link traffic timeslot to the communication unit;

g) adjusting a communication unit transmission frequency to the transmit link traffic frequency;

h) constructing a traffic burst by the communication unit which contains information describing the speech frame; and i) transmitting the traffic burst at the transmit link traffic frequency during the transmit link traffic timeslot.

3. The method as claimed in claim 2, further comprising the step of:

j) readjusting the communication unit transmission frequency to the control channel frequency after the step of transmitting the traffic burst.

4. The method as claimed in claim 1, further comprising the steps of:

h) when the speech frame is not detected, waiting a predetermined time and determining again whether the speech frame is detected;

i) when the speech frame is detected in the determining again step, resuming the method at step b); and j) when the speech frame is not detected in the determining again step, not sending the SDI to the switching facility.

5. The method as claimed in claim 1, further comprising the steps of:

h) determining, by the switching facility, a receive link traffic frequency and a receive link traffic timeslot which the switching facility will use to send a receive link traffic burst to the communication unit;

i) sending third parameters defining the receive link traffic frequency and the receive link traffic timeslot to the communication unit;

j) adjusting a communication unit receiver frequency to the receive link traffic frequency; and k) receiving, by the communication unit, the receive link traffic burst at the receive link traffic frequency and during the receive link traffic timeslot.

6. A method for communicating digital speech on a transmit link between a communication unit and a switching facility and on a receive link between the switching facility and the communication unit, wherein the digital speech is communicated during multiple timeslots and at multiple carrier frequencies, and a combination of a carrier frequency of the multiple carrier frequencies and a timeslot of the multiple timeslots can be allocated for a burst of the digital speech when the combination has not been allocated for a different burst, the method comprising the steps of:

a) determining, by the communication unit, whether a speech frame is detected;

b) when the speech frame is detected, sending a speech detected indicator (SDI) to the switching facility;

c) receiving first parameters defining a transmit link traffic timeslot of the multiple timeslots and a transmit link traffic frequency of the multiple carrier frequencies from the switching facility, wherein the transmit link traffic timeslot and the transmit link traffic frequency were allocated by the switching facility in response to the SDI, and the transmit link traffic frequency and the transmit link traffic timeslot are allocated only for a duration of the speech frame;

d) adjusting a communication unit transmission frequency to the transmit link traffic frequency;

e) constructing a traffic burst by the communication unit; and f) transmitting the traffic burst at the transmit link traffic frequency during the transmit link traffic timeslot.

7. The method as claimed in claim 6, further comprising the steps of:

g) when the speech frame is not detected, waiting a predetermined time and determining again whether the speech frame is detected;

h) when the speech frame is detected in the determining again step, resuming the method at step b); and i) when the speech frame is not detected in the determining again step, not sending the SDI to the switching facility.

8. A method for communicating digital speech on a transmit link between a communication unit and a switching facility and on a receive link between the switching facility and the communication unit, wherein the digital speech is communicated during multiple timeslots and at multiple carrier frequencies, and a combination of a carrier frequency of the multiple carrier frequencies and a timeslot of the multiple timeslots can be allocated for a burst of the digital speech when the combination has not been allocated for a different burst, the method comprising the steps of:

a) receiving a speech detected indicator (SDI) from the communication unit after the communication unit detects a speech frame;

b) allocating, by the switching facility, a transmit link traffic frequency of the multiple carrier frequencies and a transmit link traffic timeslot of the multiple timeslots in response to the SDI for the communication unit to use for the speech frame, wherein the transmit link traffic frequency and the transmit link traffic timeslot are allocated only for a duration of the speech frame;

c) sending first parameters defining the transmit link traffic frequency and the transmit link traffic timeslot to the communication unit; and d) receiving a traffic burst from the communication unit at the transmit link traffic frequency and during the transmit link traffic timeslot.

9. The method as claimed in claim 8, further comprising the steps of:

e) allocating a receive link traffic frequency and a receive link traffic timeslot when the switching facility has a receive link traffic burst to send to the communication unit;

f) sending second parameters defining the receive link traffic frequency and the receive link traffic timeslot to the communication unit; and g) sending the receive link traffic burst to the communication unit at the receive link traffic frequency and during the receive link traffic timeslot.

10. A method for communicating digital speech between a communication unit and a switching facility using a time division multiple access (TDMA), frequency division multiple access (FDMA) protocol comprising a receive link control burst segment, a transmit link control burst segment, a transmit link traffic burst segment, and a receive link traffic burst segment, each segment being separated from each other segment in a time domain, the method comprising the steps of:

a) receiving, by the switching facility, a speech detected indicator (SDI) in the transmit link control burst segment, wherein the SDI is sent by the communication unit each time the communication unit detects a speech frame;

b) sending, by the switching facility in response to the SDI, first parameters in the receive link control burst segment, wherein the first parameters describe a transmit link traffic frequency and a transmit link traffic timeslot at which the communication unit should send a transmit link traffic burst;

c) sending, by the switching facility, second parameters in the receive link control burst segment, wherein the second parameters describe a receive link traffic frequency and a receive link traffic timeslot at which the communication unit should receive a receive link traffic burst;

d) receiving, by the switching facility, the transmit link traffic burst from the communication unit at the transmit link traffic frequency and during the transmit link traffic timeslot; and e) sending, by the switching facility, the receive link traffic burst to the communication unit at the receive link traffic frequency and during the receive link traffic timeslot.

11. The method as claimed in claim 10, further comprising the steps, performed by the communication unit, of:

f) determining whether the speech frame is detected;

g) when the speech frame is detected, sending the SDI in the transmit link control burst segment;

h) receiving the first parameters and the second parameters in the receive link control burst segment;

i) constructing the transmit link traffic burst from the speech frame;

j) sending the transmit link traffic burst during the transmit link traffic timeslot at the transmit link traffic frequency;

k) receiving the receive link traffic burst during the receive link traffic timeslot at the receive link traffic frequency; and l) reconstructing a different speech frame from the receive link traffic burst.

12. A method for communicating digital speech on a transmit link between a communication unit and a switching facility and on a receive link between the switching facility and the communication unit, wherein the digital speech is communicated during multiple timeslots and at multiple carrier frequencies, and a combination of a carrier frequency of the multiple carrier frequencies and a timeslot of the multiple timeslots can be allocated for a burst of the digital speech when the combination has not been allocated for a different burst, the method comprising the steps of:

a) sending, by the communication unit, a speech detected indicator (SDI) to the switching facility when the communication unit detects a speech frame;

b) sending, by the switching facility, first parameters to the communication unit in response to the SDI, wherein the first parameters describe a transmit link traffic frequency and a transmit link traffic timeslot which the communication unit must use for transmission of the speech frame, and wherein the transmit link traffic frequency and the transmit link traffic timeslot are allocated only for a duration of the speech frame; and c) transmitting, by the communication unit, a transmit link traffic burst which contains an encoded representation of the speech frame, wherein the transmit link traffic burst is transmitted at the transmit link traffic frequency and during the transmit link traffic timeslot.

13. The method as claimed in claim 12, wherein the step a) of sending the SDI comprises the steps of:

a1) determining, by the communication unit, whether the speech frame is detected; and a2) sending the SDI to the switching facility each time the speech frame is detected.

14. The method as claimed in claim 13, wherein the step b) of sending the first parameters comprises the steps of:

b1) allocating, by the switching facility, the transmit link traffic frequency from the multiple frequencies and the transmit link traffic timeslot from the multiple timeslots each time the communication unit sends the SDI to the switching facility; and b2) sending the first parameters to the communication unit.

15. The method as claimed in claim 14, wherein the step c) of transmitting the transmit link traffic burst comprises the steps of:

c1) adjusting a communication unit transmitter frequency to the transmit link traffic frequency;

c2) constructing the transmit link traffic burst by a vocoder contained in the communication unit; and c3) transmitting the transmit link traffic burst during the transmit link traffic timeslot and at the transmit link traffic frequency.

16. The method as claimed in claim 15, further comprising the steps of:

d) allocating, by the switching facility, a receive link traffic frequency and a receive link traffic timeslot when the switching facility has a receive link traffic burst to send to the communication unit;

e) sending second parameters describing the receive link traffic frequency and the receive link traffic timeslot to the communication unit;

f) adjusting a communication unit receiver frequency to the receive link traffic frequency; and g) receiving, by the communication unit, the receive link traffic burst during the receive link traffic timeslot and at the receive link traffic frequency.

17. The method as claimed in claim 16, wherein the switching facility is located within a satellite, the communication unit is a radio-frequency (RF) communication device, and the step c) of transmitting comprises the step of:

c1) transmitting the transmit link traffic burst over an RF link between the communication unit and the satellite; and the step g) of receiving the receive link traffic burst comprises the step of:

g1) receiving the receive link traffic burst over the RF link.

18. A communication unit comprising:

a speech detector for determining whether a speech frame is detected;

a controller coupled to the speech detector for sending a speech detected indicator (SDI) to a switching facility when the speech frame is detected, receiving an allocation message from the switching facility in response to the SDI, determining, from the allocation message, a transmit link traffic frequency and a transmit link traffic timeslot at which the communication unit should transmit a transmit link traffic burst which contains an encoded representation of the speech frame, wherein the transmit link traffic frequency and the transmit link traffic timeslot are allocated only for a duration of the speech frame;

a vocoder coupled to the speech detector for creating the encoded representation of the speech frame; and a transmitter coupled to the controller for transmitting the transmit link traffic burst and for transmitting the SDI.

19. The communication unit as claimed in claim 18, further comprising:

a receiver coupled to the controller for receiving the allocation message and for receiving a receive link traffic burst;

wherein the controller is further for determining a receive link traffic frequency and a receive link traffic timeslot from the allocation message; and wherein the vocoder is further for decoding the receive link traffic burst.

20. A switching facility used in a communication system where available spectrum is divided into multiple carrier frequencies, multiple timeslots exist for each of the multiple carrier frequencies, a reuse unit is a communication opportunity defined by a combination of a carrier frequency of the multiple carrier frequencies and a timeslot of the multiple timeslots, transmit link traffic is traffic from a communication unit to the switching facility, and receive link traffic is traffic from the switching facility to the communication unit, the switching facility comprising:

a controller for allocating a transmit link traffic frequency from the multiple carrier frequencies and a transmit link traffic timeslot from the multiple timeslots in response to a speech detected indicator (SDI), wherein the SDI is sent by the communication unit each time that the communication unit has detected a speech frame, the controller further for creating an allocation message containing parameters describing the transmit link traffic frequency and the transmit link traffic timeslot;

a receiver coupled to the controller for receiving the SDI from the communication unit, and for receiving a traffic burst containing an encoded representation of the speech frame at the transmit link traffic frequency and during the transmit link traffic timeslot; and a transmitter coupled to the controller for sending the allocation message to the communication unit.

* * * * *